US012142198B1

(12) United States Patent
Watanabe et al.

(10) Patent No.: US 12,142,198 B1
(45) Date of Patent: Nov. 12, 2024

(54) DISPLAY DEVICE

(71) Applicant: Innolux Corporation, Miaoli County (TW)

(72) Inventors: Hidetoshi Watanabe, Miaoli County (TW); Hirofumi Watsuda, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/316,236

(22) Filed: May 12, 2023

(51) Int. Cl.
*G09G 3/32* (2016.01)

(52) U.S. Cl.
CPC ....... *G09G 3/32* (2013.01); *G09G 2300/0804* (2013.01); *G09G 2300/0819* (2013.01); *G09G 2300/0852* (2013.01); *G09G 2300/0861* (2013.01); *G09G 2310/0202* (2013.01); *G09G 2310/0248* (2013.01); *G09G 2310/08* (2013.01); *G09G 2320/02* (2013.01)

(58) Field of Classification Search
None
See application file for complete search history.

(56) References Cited

U.S. PATENT DOCUMENTS

2017/0061865 A1* 3/2017 Park .......................... G09G 3/325
2020/0035168 A1* 1/2020 Ueno .......................... G09G 3/3291
2022/0328013 A1* 10/2022 Roh .......................... G09G 3/3266

* cited by examiner

*Primary Examiner* — Stephen T. Reed
(74) *Attorney, Agent, or Firm* — JCIPRNET

(57) ABSTRACT

A display device includes a plurality of pixels and a de-multiplexer. The plurality of pixels are electrically connected to a plurality of data signal lines and a scan signal line, and configured to receive a scan signal through the scan signal line. The de-multiplexer includes a plurality of switch transistors electrically connected to the plurality of pixels through the plurality of data signal lines. The plurality of switch transistors are controlled by a plurality of clock signals. A period of a scan waveform of the scan signal is at least partially overlapped with a period of one of the plurality of clock signals with a last clock waveform. The period of the scan waveform of the scan signal is started after a start of the last clock waveform.

20 Claims, 17 Drawing Sheets

DISPLAY DEVICE

BACKGROUND

Technical Field

The disclosure relates a device; particularly, the disclosure relates to a display device.

Description of Related Art

For a general display device with high resolution, the cost and volume of the display device cannot be effectively reduced due to the excessive number of data driver circuits. Moreover, the general display device still has the problem of incorrect brightness, which is caused by the fact that the control terminals of some driving transistors in the display device cannot obtain the correct data voltage.

SUMMARY

The display device of the disclosure includes a plurality of pixels and a de-multiplexer. The plurality of pixels are electrically connected to a plurality of data signal lines and a scan signal line, and configured to receive a scan signal through the scan signal line. The de-multiplexer includes a plurality of switch transistors electrically connected to the plurality of pixels through the plurality of data signal lines. The plurality of switch transistors are controlled by a plurality of clock signals. A period of a scan waveform of the scan signal is at least partially overlapped with a period of one of the plurality of clock signals with a last clock waveform. The period of the scan waveform of the scan signal is started after a start of the last clock waveform.

The display device of the disclosure includes a plurality of pixels, a de-multiplexer and at least one pre-charge circuit. The plurality of pixels are electrically connected to a plurality of data signal lines and a scan signal line, and configured to receive a scan signal through the scan signal line. The de-multiplexer includes a plurality of switch transistors electrically connected to the plurality of pixels through the plurality of data signal lines. The plurality of switch transistors are controlled by a plurality of clock signals. The at least one pre-charge circuit is electrically connected to at least one of the plurality of data signal lines, and configured to pre-charge the at least one of the plurality of data signal lines. A period of a scan waveform of the scan signal is at least partially overlapped with a period of one of the plurality of clock signals with a last clock waveform. The period of the scan waveform of the scan signal is started with or after a start of the last clock waveform.

Based on the above, each pixel of the display device of the disclosure can provide correct brightness, and the number of the data driver circuits in the display device may also be effectively reduce.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
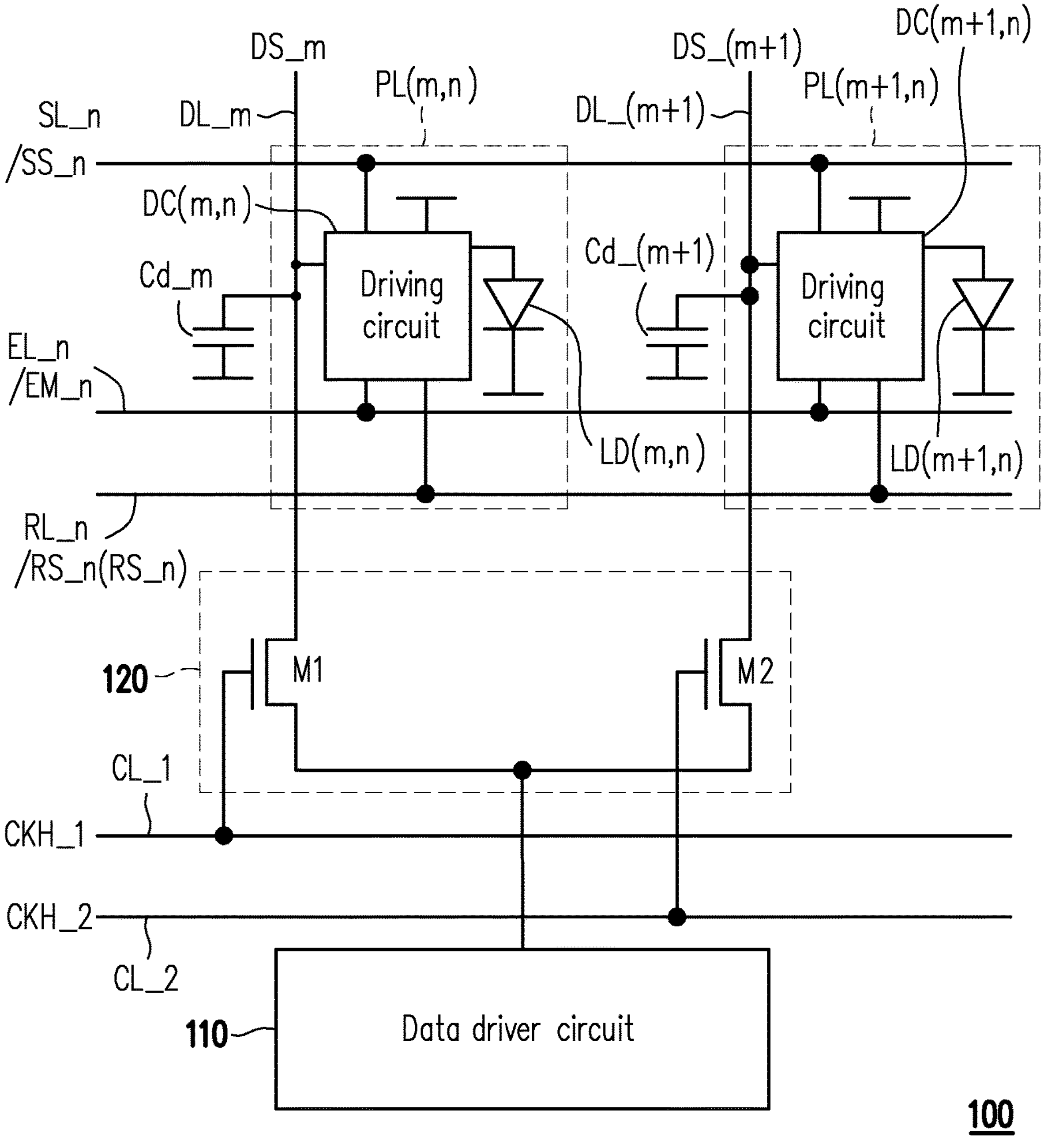
FIG. 1 is a schematic diagram of a display device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

In the disclosure, the display device of each following embodiment may include a pixel array, a plurality of de-multiplexers and a plurality of data driver circuits. The pixel array may include a plurality of pixels in N rows and M columns, wherein N and M are positive integers. Each one of plurality of data driver circuit is electrically connected to the pixels in the multiple columns through corresponding one de-multiplexer and a plurality of data signal lines. The data driver circuit may output one common data signal to the corresponding one de-multiplexer, and the corresponding one de-multiplexer may further output a plurality of data signals to the pixels in the multiple columns according to the one common data signal. Moreover, the pixels in the multiple columns and different rows may receive the data signals at different times during different scan periods according to a plurality of scan signals. The pixels in each column may receive the same scan signal through one scan signal line. Therefore, the display device of each following embodiment may effectively reduce the number of data driving circuits.

The display device of the disclosure may be an active matrix light emitting diode (AM-LED) display device, but the disclosure is not limited thereto. In some embodiment of the disclosure, the display device of the disclosure may, for example, be adapted to a liquid crystal, a light emitting diode, a quantum dot (QD), a fluorescence, a phosphor, other suitable display medium, or the combination of the aforementioned material, but the disclosure is not limited thereto. The light emitting diode may include, for example, organic light emitting diode (OLED), sub-millimeter light emitting diode (Mini LED), micro light emitting diode (Micro LED), or quantum dot light emitting diode (QLED or QDLED) or other suitable materials. The materials may be arranged and combined arbitrarily, but the disclosure is not limited to thereto. The display device of the disclosure may include peripheral systems such as driving system, control system, light source system, shelf system, and the like to support the light emitting device.

FIG. 1 is a schematic diagram of a display device according to an embodiment of the disclosure. Referring to FIG. 1, taking one data driving circuit driving two adjacent pixels in the same row as an example, the display device 100 includes a data driver circuit 110, a de-multiplexer 120 and two pixels PL(m,n) and PL(m+1,n), two data signal lines DL_m with data capacitor Cd_m and DL_(m+1) with data capacitor Cd_(m+1), a scan signal line SL_n, an emission signal line EL_n, a reset signal line RL_n and two clock signal lines CL_1 and CL_2, wherein n is an integer between 1 and N, and m is an integer between 1 and M. It should be noted that the data capacitor Cd is a parasitic capacitor formed due to the gap between the data signal line DL and other components beside the data signal line. In the embodiment of the disclosure, the pixel PL(m,n) includes a driving circuit DC(m,n) and a light emitting diode LD(m,n), and the pixel PL(m+1,n) includes a driving circuit DC(m+1,n) and a light emitting diode LD(m+1,n). The driving circuits DC(m,n) and DC(m+1,n) are electrically connected to the scan signal line SL_n, the emission signal line EL_n and the reset signal line RL_n, so as to receive a scan signal /SS_n, an emission signal /EM_n and a reset signal /RS_n. The driving circuit DC(m,n) is further electrically connected to the light emitting diode LD(m,n), and is further electrically connected to the data signal line DL_m to receive a data signal DS_m. The driving circuit DC(m+1,n) is further electrically connected to the light emitting diode LD(m+1,n), and is further electrically connected to the data signal line DL_(m+1) to receive a data signal DS_(m+1). In addition, in one embodiment of the disclosure, the pixels PL(m,n) and PL(m+1,n) may further electrically connected to a compensation signal line (not shown) to receive a compensation signal.

In the embodiment of the disclosure, the de-multiplexer 120 includes two switch transistors M1 and M2. It should be noted that the number of the switch transistors in the de-multiplexer 120 may be determined by the number of pixels in different columns driven by the data driver circuit 110, but the disclosure is not limited thereto. A first terminal of the switch transistor M1 is electrically connected to the pixel PL(m,n) through the data signal line DL_m. A second terminal of the switch transistor M1 is electrically connected to the data driver circuit 110. A control terminal of the switch transistor M1 is electrically connected to the clock signal line CL_1, so as to receive a clock signal CKH_1. The switch transistor M1 is controlled by the clock signal CKH_1. A first terminal of the switch transistor M2 is electrically connected to the pixel PL(m+1,n) through the data signal line DL_(m+1). A second terminal of the switch transistor M2 is electrically connected to the data driver circuit 110. A control terminal of the switch transistor M2 is electrically connected to the clock signal line CL_2, so as to receive a clock signal CKH_2. The switch transistor M2 is controlled by the clock signal CKH_2. In the embodiment of the disclosure, the switch transistors M1 and M2 may be N-type transistors, but the disclosure is not limited thereto. In one embodiment of the disclosure, the switch transistors M1 and M2 may be P-type transistors.

In the embodiment of the disclosure, the data driver circuit 110 may output a common data signal to the de-multiplexer 120, and the de-multiplexer 120 may output the data signals DS_m and DS_(m+1) through the data signal lines DL_m and DL_(m+1) according to the clock signals CKH_1, CKH_2 and the common data signal. The switch transistors M1 and M2 may be turned-on in a time-dividing manner, so as to divide the common data signal into data signals DS_m and DS_(m+1).

Figure 2:
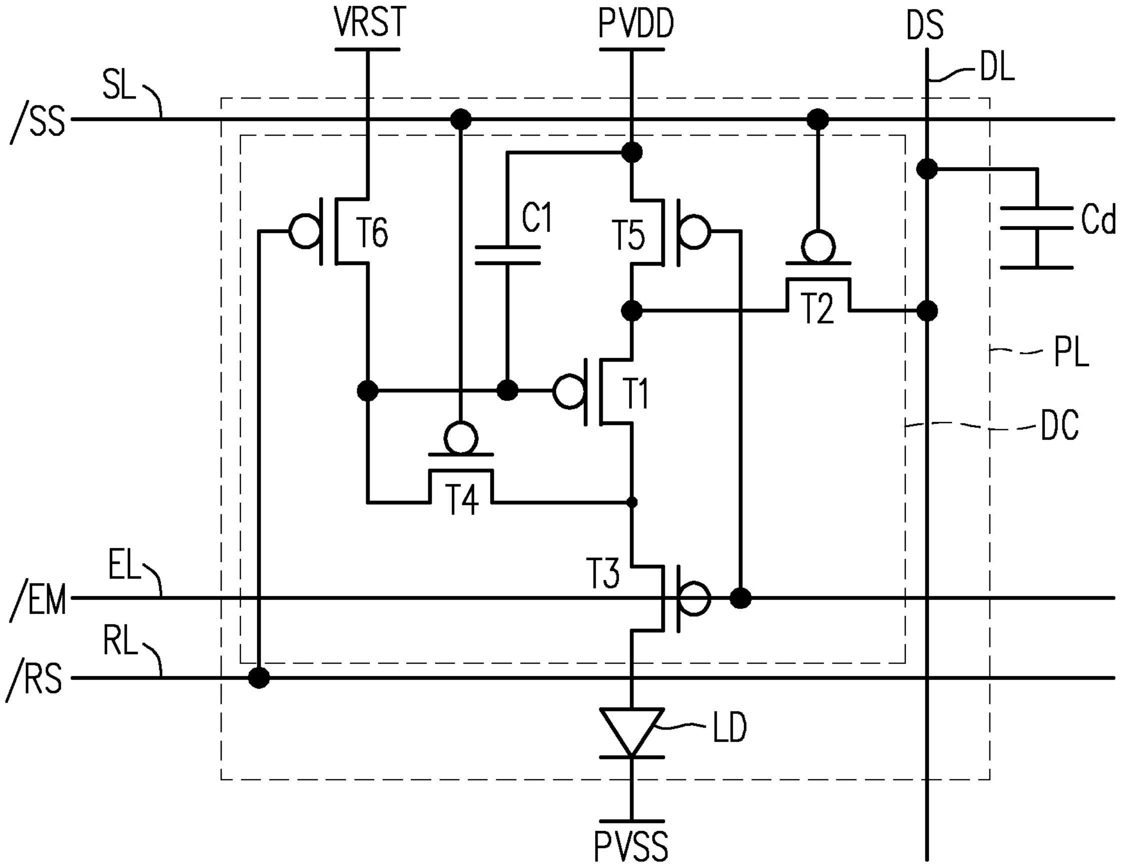
FIG. 2 is a schematic diagram of a circuit in a pixel according to an embodiment of the disclosure.

FIG. 2 is a schematic diagram of a circuit in a pixel according to an embodiment of the disclosure Referring to FIG. 2, the pixel of some embodiments of the disclosure may be implemented in the same way as the pixel PL of FIG. 2. In the embodiment of the disclosure, the pixel PL includes a light-emitting diode LD and a driving circuit DC. The driving circuit DC includes a driving transistor T1, a scan transistor T2, two emission transistors T3 and T5, a compensation transistor T4, a reset transistor T6 and a storage capacitor C1. In the embodiment of the disclosure, a first terminal of the driving transistor T1 is electrically connected to a first terminal of the scan transistor T2 and a second terminal of the emission transistor T5. A control terminal of the driving transistor T1 is electrically connected to a first terminal of the compensation transistor T4, a second terminal of the reset transistor T6 and a second terminal of the storage capacitor C1. A second terminal of the driving transistor T1 is electrically connected to a first terminal of the emission transistor T3 and a second terminal of the compensation transistor T4. A control terminal of the scan transistor T2 is electrically connected to the scan signal line SL to receive the scan signal /SS. A second terminal of the scan transistor T2 is electrically connected to the data signal line DL to receive the data signal DS. A first terminal of the emission transistor T3 is electrically connected to the second terminal of the driving transistor T1 and the second terminal of the compensation transistor T4. A control terminal of the emission transistor T3 is electrically connected to the emission signal line EL to receive the emission signal /EM. A second terminal of the emission transistor T3 is electrically connected to the light-emitting diode LD, therefore, the driving transistor T1 may further electrically connected to the light-emitting diode LD through the emission transistor T3. The first terminal of the compensation transistor T4 is electrically connected to the second terminal of the reset transistor T6, the second terminal of the storage capacitor C1 and the control terminal of the driving transistor T1. A control terminal of the compensation transistor T4 is electrically connected to the scan signal line SL to receive the scan signal /SS. The second terminal of the compensation transistor T4 is electrically connected to the second terminal of the driving transistor T1 and the first terminal of the emission transistor T3. A first terminal of the emission transistor T5 is electrically connected to a first terminal of the storage capacitor C1 and a first operation voltage PVDD. A control terminal of the emission transistor T5 is electrically connected to the emission signal line EL to receive the emission signal /EM. A second terminal of the emission transistor T5 is electrically connected to the first terminal of the driving transistor T1 and the first terminal of the scan transistor T2. A first terminal of the reset transistor T6 is electrically connected to a reset voltage VRST. A control terminal of the reset transistor T6 is electrically connected to a reset signal line RL to receive the reset signal /RS. A second terminal of the reset transistor T6 is electrically connected to the second terminal of the storage capacitor C1, the control terminal of the driving transistor T1 and the first terminal of the compensation transistor T4. The light-emitting diode LD is electrically connected between the second terminal of the emission transistor T3 and a second operation voltage PVSS.

In the embodiment of the disclosure, the driving transistor T1, the scan transistor T2, the emission transistors T3 and T5, the compensation transistor T4 and the reset transistor T6 may be P-type transistors, but the disclosure is not limited thereto. The first terminal and the second terminal of the above transistors may be a source terminal and a drain terminal respectively, and the control terminal of the transistor may be a gate terminal. In one embodiment of the disclosure, at least one of the driving transistor T1, the scan transistor T2, the emission transistors T3 and T5, the compensation transistor T4 and the reset transistor T6 may be a N-type transistor.

Figure 3:
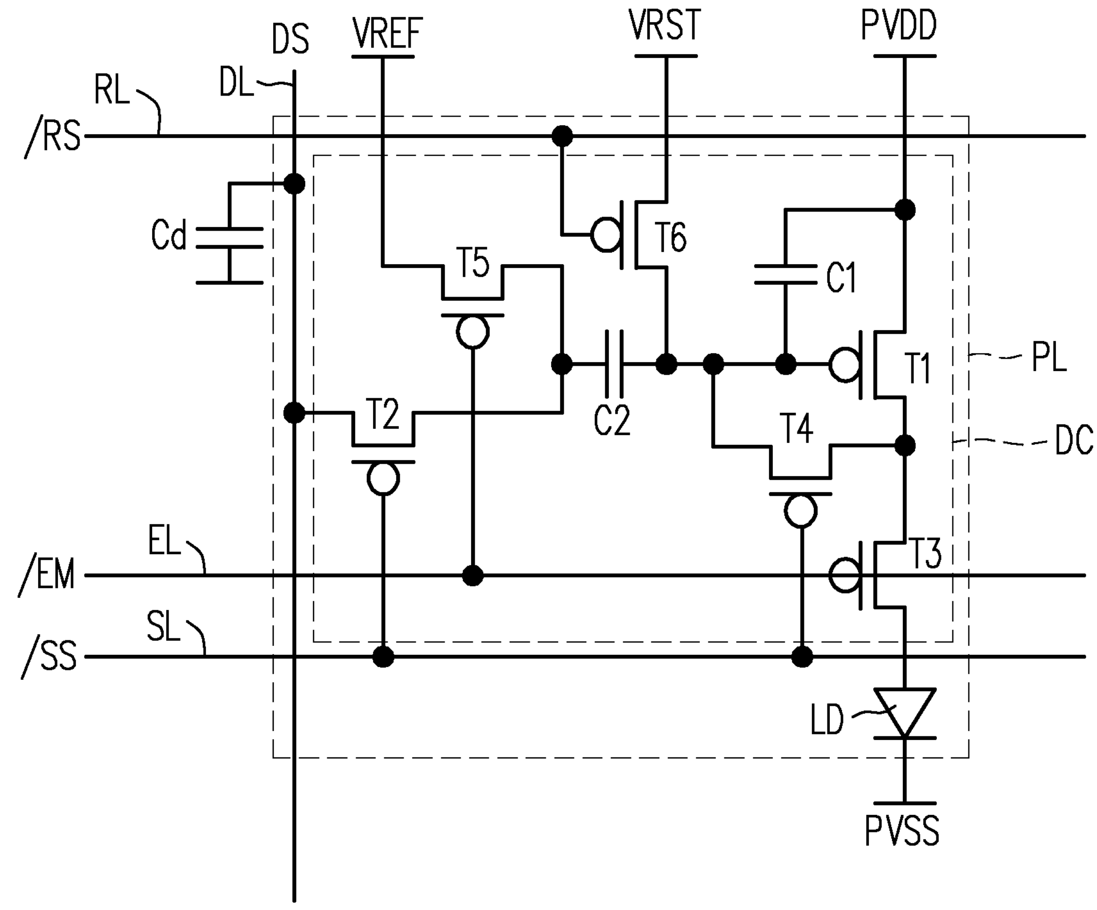
FIG. 3 is a schematic diagram of a circuit in a pixel according to an embodiment of the disclosure.

FIG. 3 is a schematic diagram of a circuit in a pixel according to an embodiment of the disclosure. Referring to FIG. 3, the pixel of some embodiments of the disclosure may be implemented in the same way as the pixel PL of FIG. 3. In the embodiment of the disclosure, the pixel PL includes a light-emitting diode LD and a driving circuit DC. The driving circuit DC includes a driving transistor T1, a scan transistor T2, two emission transistors T3 and T5, a compensation transistor T4, a reset transistor T6 and two storage capacitors C1 and C2. In the embodiment of the disclosure, a first terminal of the driving transistor T1 is electrically connected to a first terminal of the storage capacitor C1 and a first operation voltage PVDD. A control terminal of the driving transistor T1 is electrically connected to a second terminal of the storage capacitor C1, a second terminal of the reset transistor T6, a second terminal of the storage capacitor C2 and a first terminal of the compensation transistor T4. A second terminal of the driving transistor T1 is electrically connected to a second terminal of the compensation transistor T4 and a first terminal of the emission transistor T3. A first terminal of the scan transistor T2 is electrically connected to the data signal line DL to receive the data signal DS. A control terminal of the scan transistor T2 is electrically connected to the scan signal line SL to receive the scan signal /SS. A second terminal of the scan transistor T2 is electrically connected to a first terminal of the storage capacitor C2. A first terminal of the emission transistor T3 is electrically connected to the second terminal of the driving transistor T1 and the second terminal of the compensation transistor T4. A control terminal of the emission transistor T3 is electrically connected to the emission signal line EL to receive the emission signal /EM. A second terminal of the emission transistor T3 is electrically connected to the light-emitting diode LD. The first terminal of the compensation transistor T4 is electrically connected to the second terminal of the reset transistor T6, the second terminal of the storage capacitor C1, the control terminal of the driving transistor T1 and the second terminal of the storage capacitor C2. A control terminal of the compensation transistor T4 is electrically connected to the scan signal line SL to receive the scan signal /SS. The second terminal of the compensation transistor T4 is electrically connected to the second terminal of the driving transistor T1 and the first terminal of the emission transistor T3. A first terminal of the emission transistor T5 is electrically connected to a reference voltage VREF. A control terminal of the emission transistor T5 is electrically connected to the emission signal line EL to receive the emission signal /EM. A second terminal of the emission transistor T5 is electrically connected to the first terminal of the storage capacitor C2. A first terminal of the reset transistor T6 is electrically connected to a reset voltage VRST. A control terminal of the reset transistor T6 is electrically connected to a reset signal line RL to receive the reset signal /RS. A second terminal of the reset transistor T6 is electrically connected to the second terminal of the storage capacitor C2, the second terminal of the storage capacitor C1, the control terminal of the driving transistor T1 and the first terminal of the compensation transistor T4. The light-emitting diode LD is electrically connected between the second terminal of the emission transistor T3 and a second operation voltage PVSS.

In the embodiment of the disclosure, the driving transistor T1, the scan transistor T2, the emission transistors T3 and T5, the compensation transistor T4 and the reset transistor T6 may be P-type transistors, but the disclosure is not limited thereto. The first terminal and the second terminal of the above transistors may be a source terminal and a drain terminal respectively, and the control terminal of the transistor may be a gate terminal. In one embodiment of the disclosure, at least one of the driving transistor T1, the scan transistor T2, the emission transistors T3 and T5, the compensation transistor T4 and the reset transistor T6 may be a N-type transistor.

Figure 4:
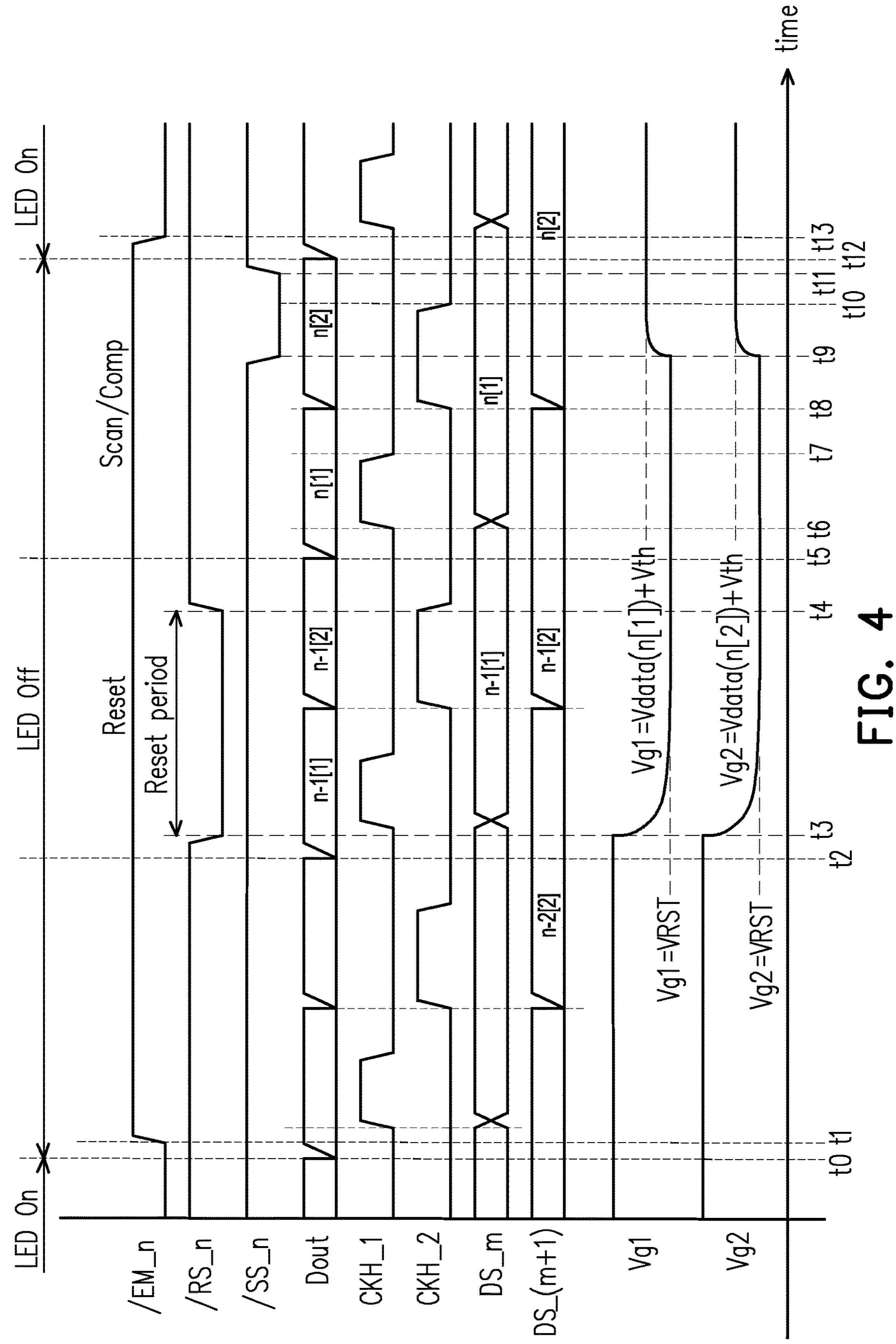
FIG. 4 is a schematic diagram of waveforms of a plurality of related signals according to an embodiment of the disclosure.

FIG. 4 is a schematic diagram of waveforms of a plurality of related signals according to an embodiment of the disclosure. Referring to FIG. 1 and FIG. 4, the display device 100 of FIG. 1 may be operated according to the signals of FIG. 4. During a period from time t0 to time t12, the pixels PL(m,n) and PL(m+1,n) may be operated in "LED off" state. During a period from time t1 to time t13, the emission signal /EM_n is changed to a high voltage level, and the light emitting diodes of the pixels PL(m,n) and PL(m+1,n) may be turned-off (because the emission transistors T3 and T5 in FIG. 2 and FIG. 3 is turned-off). During a period from time t2 to time t5, the pixels PL(m,n) and PL(m+1,n) may be operated in a reset mode. During a reset period from time t3 to time t4, the reset signal /RS_n is changed from the high voltage level to a low voltage level, and the gate voltages Vg1 and Vg2 of the control terminals of the driving transistors (i.e. the driving transistor T1 in FIG. 2 and FIG. 3) of the pixels PL(m,n) and PL(m+1,n) may be reset to the reset voltage VRST (because the reset transistor T6 in FIG. 2 and FIG. 3 is turned-on). During a period from time t5 to time t12, the pixels PL(m,n) and PL(m+1,n) may be operated in a scan/compensation mode. During a period from time t5 to time t8, the data driver circuit 110 may provide a common data signal Dout with a data voltage (n[1]) for the pixel PL(m,n) of n-th row of the pixel array the display device 100. During a period from time t8 to time t12, the data driver circuit 110 may provide a common data signal Dout with a data voltage (n[2]) for the pixel PL(m+1,n) of n-th row of the pixel array the display device 100.

During a period from time t6 to time t7, the clock signal CKH_1 is changed from the low voltage level to the high voltage level, and the switch transistor M1 is turned-on. Thus, the data signal line DL_m may transmit the data signal DS_m with the data voltage (n[1]) to the pixel PL(m,n), and store the data voltage (n[1]) into the data capacitor Cd_m. During a period from time t8 to time t10, the clock signal CKH_2 is changed from the low voltage level to the high voltage level, and the switch transistor M2 is turned-on. Thus, the data signal line DL_(m+1) may transmit the data signal DS_(m+1) with the data voltage (n[2]) to the pixel PL(m+1,n), and store the data voltage (n[2]) into the data capacitor Cd_(m+1).

During a period from time t9 to time t11, the scan signal /SS_n is changed from the high voltage level to the low voltage level, and the scan transistor T2 is turned-on, the data voltage (n[1]) in the data capacitor Cd_m and the data voltage (n[2]) in the data capacitor Cd_(m+1) may transmit into the pixel PL(m,n) and PL(m+1,n) respectively, and also the compensation transistor T4 is turned-on, and the driving transistor T1 forms a diode connection. Therefore, by the diode clamp effect, the gate voltage Vg1 of the control terminal of the driving transistor (i.e. the driving transistor T1 in FIG. 2 and FIG. 3) of the pixel PL(m,n) may be changed to the voltage of a data voltage (n[1]) plus a threshold voltage Vth of driving transistor (Vg1=Vdata(n[1])+Vth), and the gate voltage Vg2 of the control terminal of the driving transistor (i.e. the driving transistor T1 in FIG. 2 and FIG. 3) of the pixel PL(m+1,n) may be changed to the voltage of a data voltage (n[2]) plus a threshold voltage Vth of driving transistor (Vg2=Vdata(n[2])+Vth). That is, the period (i.e. time t9 to time t11) of the scan waveform (i.e. the waveform of the low voltage level) of the scan signal /SS is overlapped with the period (i.e. time t8 to time t10) of clock signal CKH_2 with a last clock waveform. Therefore, the light emitting diodes of the pixels PL(m,n) and PL(m+1,n) may have the correct brightness according to the gate voltages Vg1 and Vg2 when the pixels PL(m,n) and PL(m+1,n) are operated in the "LED on" state (i.e. after time t13).

Figure 5:
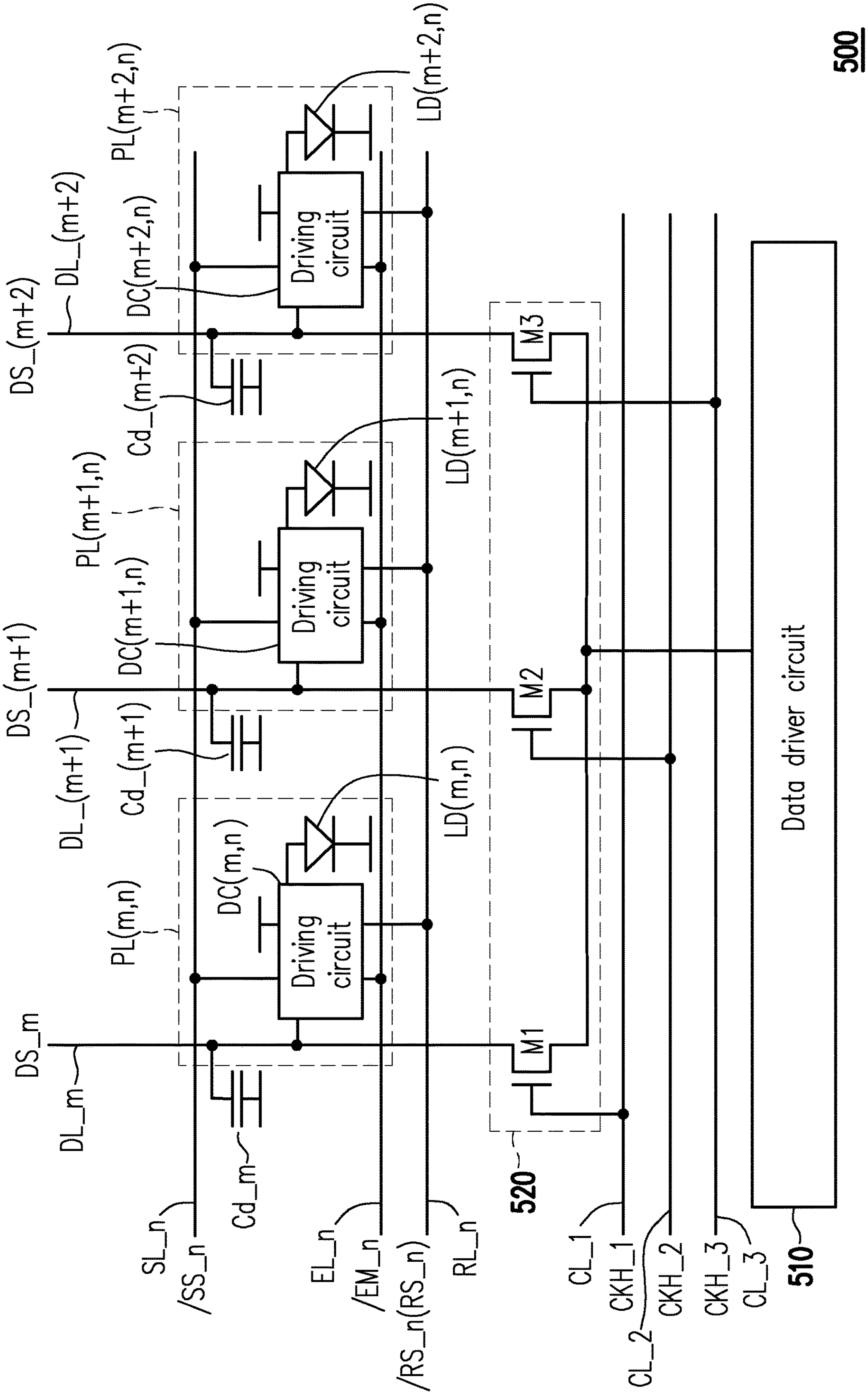
FIG. 5 is a schematic diagram of a display device according to an embodiment of the disclosure.

FIG. 5 is a schematic diagram of a display device according to an embodiment of the disclosure. Referring to FIG. 5, taking one data driving circuit driving three adjacent pixels in the same row as an example, the display device 500 includes a data driver circuit 510, a de-multiplexer 520, three pixels PL(m,n), PL(m+1,n) and PL(m+2,n), a scan signal line SL_n, an emission signal line EL_n, a reset signal line RL_n and three clock signal lines CL_1, CL_2 and CL_3, wherein n is an integer between 1 and N, and m is an integer between 1 and M. In the embodiment of the disclosure, the specific circuit architectures of the pixels PL(m,n), PL(m+1,n) and PL(m+2,n) may be implemented in the same way as the pixel PL of FIG. 2, FIG. 3 or FIG. 16 respectively.

In the embodiment of the disclosure, the pixel PL(m,n) includes a driving circuit DC(m,n) and a light emitting diode LD(m,n). The pixel PL(m+1,n) includes a driving circuit DC(m+1,n) and a light emitting diode LD(m+1,n). The pixel PL(m+2,n) includes a driving circuit DC(m+2,n) and a light emitting diode LD(m+2,n). The driving circuits DC(m,n), DC(m+1,n) and DC(m+2,n) are electrically connected to the scan signal line SL_n, the emission signal line EL_n and the reset signal line RL_n, so as to receive a scan signal /SS_n, an emission signal /EM_n and a reset signal /RS_n. The driving circuit DC(m,n) is further electrically connected to the light emitting diode LD(m,n), and is further electrically connected to the data signal line DL_m to receive a data signal DS_m. The driving circuit DC(m+1,n) is further electrically connected to the light emitting diode LD(m+1,n), and is further electrically connected to the data signal line DL_(m+1) to receive a data signal DS_(m+1). The driving circuit DC(m+2,n) is further electrically connected to the light emitting diode LD(m+2,n), and is further electrically connected to the data signal line DL_(m+2) to receive a data signal DS_(m+2). In addition, in one embodiment of the disclosure, the pixels PL(m,n), PL(m+1,n) and PL(m+2,n) may further electrically connected to a compensation signal line (not shown) to receive a compensation signal.

In the embodiment of the disclosure, the de-multiplexer 520 includes three switch transistors M1, M2 and M3. It should be noted that the number of the switch transistors in the de-multiplexer 520 is determined by the number of pixels in different columns driven by the data driver circuit 510. A first terminal of the switch transistor M1 is electrically connected to the pixel PL(m,n) through the data signal line DL_m. A second terminal of the switch transistor M1 is electrically connected to the data driver circuit 510. A control terminal of the switch transistor M1 is electrically connected to the clock signal line CL_1, so as to receive a clock signal CKH_1. The switch transistor M1 is controlled by the clock signal CKH_1. A first terminal of the switch transistor M2 is electrically connected to the pixel PL(m+1,n) through the data signal line DL_(m+1). A second terminal of the switch transistor M2 is electrically connected to the data driver circuit 510. A control terminal of the switch transistor M2 is electrically connected to the clock signal line CL_2, so as to receive a clock signal CKH_2. The switch transistor M2 is controlled by the clock signal CKH_2. A first terminal of the switch transistor M3 is electrically connected to the pixel PL(m+2,n) through the data signal line DL_(m+2). A second terminal of the switch transistor M3 is electrically connected to the data driver circuit 510. A control terminal of the switch transistor M3 is electrically connected to the clock signal line CL_3, so as to receive a clock signal CKH_3. The switch transistor M3 is controlled by the clock signal CKH_3. In the embodiment of the disclosure, the switch transistors M1, M2 and M3 may be N-type transistors, but the disclosure is not limited thereto. In one embodiment of the disclosure, the switch transistors M1, M2 and M3 may be P-type transistors.

In the embodiment of the disclosure, the data driver circuit 510 may output a common data signal to the de-multiplexer 520, and the de-multiplexer 520 may output the data signals DS_m, DS_(m+1) and DS_(m+2) through the data signal lines DL_m, DL_(m+1) and DL_(m+2) according to the clock signals CKH_1, CKH_2, and CKH_3 and the common data signal. The switch transistors M1, M2 and M3 may be turned-on in time-dividing manner, so as to divide the common data signal to generate the data signals DS_m, DS_(m+1) and DS_(m+2).

Figure 6:
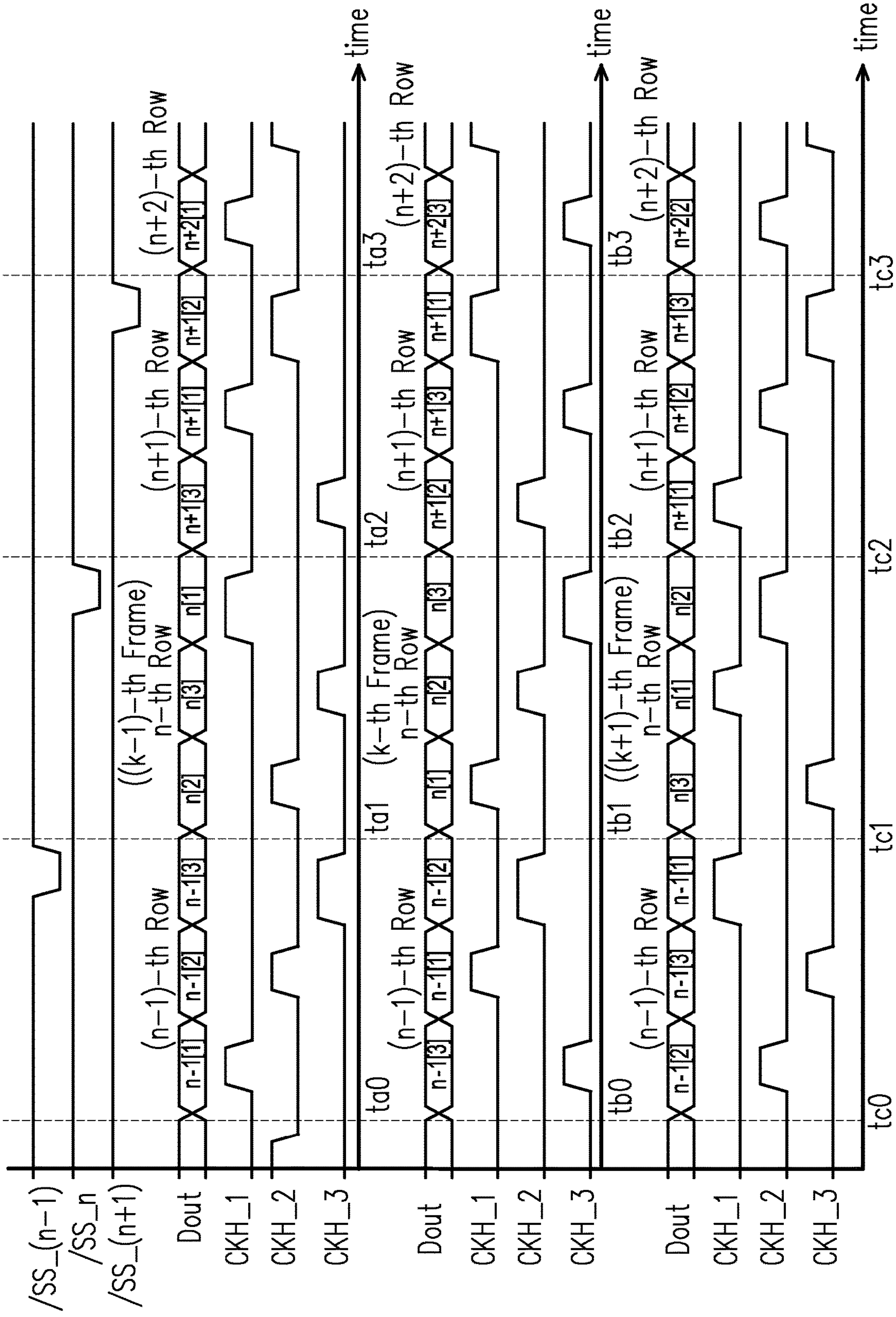
FIG. 6 is a schematic diagram of waveforms of a plurality of related signals according to an embodiment of the disclosure.

FIG. 6 is a schematic diagram of waveforms of a plurality of related signals according to an embodiment of the disclosure. Referring to FIG. 5 and FIG. 6, the display device 500 of FIG. 5 may be operated according to the signals of FIG. 6. In the embodiment of the disclosure, the pixel array of the display device 500 may, for example, include three groups of pixels, and the three groups of pixels are arranged in different rows (e.g. the (n−1)-th row, the n-th row and the (n+1)-th row). The pixels of the (n−1)-th row are electrically connected to the data signal lines DL_m, DL_(m+1) and DL_(m+2), and the pixels of the (n−1)-th row receive a scan signal /SS_(n−1) through the another scan signal line. The pixels of the n-th row are electrically connected to the data signal lines DL_m, DL_(m+1) and DL_(m+2), and the pixels of the n-th row receive the scan signal /SS_n through the scan signal line SL_n. The pixels of the (n+1)-th row are electrically connected to the data signal lines DL_m, DL_(m+1) and DL_(m+2), and the pixels of the (n+1)-th row receive a scan signal /SS_(n+1) through the yet another scan signal line. The switch transistors M1, M2 and M3 are electrically connected to the pixels of the (n−1)-th to (n+1)-th rows through the data signal lines DL_m, DL_(m+1) and DL_(m+2). In the embodiment of the disclosure, a turn-on sequence of the switch transistors M1, M2 and M3 in a scan period of the pixels of the (n−1)-th row is different from a turn-on sequence of the plurality of the switch transistors M1, M2 and M3 in a scan period of the pixels of the n-th row, and the turn-on sequence of the switch transistors M1, M2 and M3 in a scan period of the pixels of the n-th row is also different from a turn-on sequence of the plurality of the switch transistors M1, M2 and M3 in a scan period of the pixels of the (n+1)-th row.

Specifically, during a scan period of the pixels of the (n−1)-th row from time ta0 to time ta1 in a (k−1)-th frame, the data driver circuit 510 may output the common data signal Dout with different three data voltages (i.e. n−1[1], n−1[2], n−1[3]) for the corresponding three pixels of the (n−1)-th row, wherein k is a positive integer. Moreover, the clock signals CKH_1, CKH_2, and CKH_3 may be sequentially changed from the low voltage level to the high voltage level to sequentially turn-on the switch transistors M1, M2 and M3 during the period from time ta0 to time ta1, and the de-multiplexer 520 may sequentially provide the data voltages (i.e. n−1[1], n−1[2], n−1[3]) to the data signal lines DL_m, DL_(m+1) and DL_(m+2), and the data voltages (i.e. n−1[1], n−1[2], n−1[3]) may be stored into the corresponding data capacitors. Then, during a period at least partially overlapped with the period of the clock signal CKH_3 with a last clock waveform, the scan signal /SS_(n−1) is changed from the high voltage level to the low voltage level, and the data voltages (i.e. n−1[1], n−1[2], n−1[3]) stored in the corresponding data capacitors may be written to the gate voltages of the control terminals of the driving transistors of the three pixels of the (n−1)-th row. Moreover, the period of the scan waveform of the scan signal /SS_(n−1) having the low voltage level is started after a start of the last clock waveform of the clock signal CKH_3 having the high voltage level. Thus, the three pixels PL(m, n−1), PL(m+1,n−1) and PL(m+2,n−1) of the (n−1)-th row may have the correct brightness according to the corresponding gate voltages when the three pixels of the (n−1)-th row are operated in the LED on state.

During a scan period of the pixels of the n-th row from time ta1 to time ta2 in the (k−1)-th frame, the data driver circuit 510 may output the common data signal Dout with different three data voltages (i.e. n[2], n[3], n[1]) for the corresponding three pixels of the n-th row. Moreover, the clock signals CKH_2, CKH_3, and CKH_1 may be sequentially changed from the low voltage level to the high voltage level to sequentially turn-on the switch transistors M2, M3 and M1 during the period from time ta1 to time ta2, and the de-multiplexer 520 may sequentially provide the data voltages (i.e. n[2], n[3], n[1]) to the data signal lines DL_(m+1), DL_(m+2) and DL_m, and the data voltages (i.e. n[2], n[3], n[1]) may be stored into the corresponding data capacitors. Then, during a period at least partially overlapped with the period of the clock signal CKH_1 with the last clock waveform, the scan signal /SS_n is changed from the high voltage level to the low voltage level, and the data voltages (i.e. n[2], n[3], n[1]) stored in the corresponding data capacitors may be written to the gate voltages of the control terminals of the driving transistors of the three pixels of the n-th row. Moreover, the period of the scan waveform of the scan signal /SS_n having the low voltage level is started after a start of the last clock waveform of the clock signal CKH_1 having the high voltage level. Thus, the three pixels PL(m,n), PL(m+1,n) and PL(m+2,n) of the n-th row may have the correct brightness according to the corresponding gate voltages when the three pixels of the n-th row are operated in the LED on state.

During a scan period of the pixels of the (n+1)-th row from time ta2 to time ta3 in the (k−1)-th frame, the data driver circuit 510 may output the common data signal Dout with different three data voltages (i.e. n+1[3], n+1[1], n+1[2]) for the corresponding three pixels of the (n+1)-th row. Moreover, the clock signals CKH_3, CKH_1, and CKH_2 may be sequentially changed from the low voltage level to the high voltage level to sequentially turn-on the switch transistors M3, M1 and M2 during the period from time ta2 to time ta3, and the de-multiplexer 520 may sequentially provide the data voltages (i.e. n+1[3], n+1[1], n+1[2]) to the data signal lines DL_(m+2), DL_m and DL_(m+1), and the data voltages (i.e. n+1[3], n+1[1], n+1[2]) may be stored into the corresponding data capacitors. Then, during a period at least partially overlapped with the period of the clock signal CKH_2 with the last clock waveform, the scan signal /SS_(n+1) is changed from the high voltage level to the low voltage level, and the data voltages (i.e. n[3], n[1], n[2]) stored in the corresponding data capacitors may be written to the gate voltages of the control terminals of the driving transistors of the three pixels of the (n+1)-th row. Moreover, the period of the scan waveform of the scan signal /SS_(n+1) having the low voltage level is started after a start of the last clock waveform of the clock signal CKH_2 having the high voltage level. Thus, the three pixels PL(m, n+1), PL(m+1,n+1) and PL(m+2,n+1) of the (n+1)-th row may have the correct brightness in the (k−1)-th frame according to the corresponding gate voltages when the three pixels of the (n+1)-th row are operated in the LED on state.

Therefore, the turn-on sequences of the switch transistors M1, M2 and M3 in the scan periods of the (n−1)-th, n-th and (n+1)-th rows of the pixels are different row by row.

During a scan period of the pixels of the (n−1)-th row from time tb0 to time tb1 in a k-th frame, the data driver circuit 510 may output the common data signal Dout with different three data voltages (i.e. n−1[3], n−1[1], n−1[2]) for the corresponding three pixels of the (n−1)-th row. Moreover, the clock signals CKH_3, CKH_1, and CKH_2 may be sequentially changed from the low voltage level to the high voltage level to sequentially turn-on the switch transistors M3, M1 and M2 during the period from time tb0 to time tb1, and the de-multiplexer 520 may sequentially provide the data voltages (i.e. n−1[3], n−1[1], n−1[2]) to the data signal lines DL_(m+2), DL_m and DL_(m+1), and the data voltages (i.e. n−1[3], n−1[1], n−1[2]) may be stored into the corresponding data capacitors. Then, during a period at least partially overlapped with the period of the clock signal CKH_2 with the last clock waveform, the scan signal /SS_(n−1) is changed from the high voltage level to the low voltage level, and the data voltages (i.e. n−1[3], n−1[1], n−1[2]) stored in the corresponding data capacitors may be written to the gate voltages of the control terminals of the driving transistors of the three pixels of the (n−1)-th row. Moreover, the period of the scan waveform of the scan signal /SS_(n−1) having the low voltage level is started after a start of the last clock waveform of the clock signal CKH_2 having the high voltage level. Thus, the three pixels of the (n−1)-th row may have the correct brightness in the k-th frame according to the corresponding gate voltages when the three pixels of the (n−1)-th row are operated in the LED on state. During a scan period of the pixels of the n-th row from time tb1 to time tb2 in the k-th frame and a scan period of the pixels of the (n+1)-th row from time tb2 to time tb3 in the k-th frame, the waveform change relationships of the clock signals CKH_1, CKH_2, CKH_3, the scan signals /SS_n and /SS_(n+1) may be deduced by analogy.

During a scan period of the pixels of the (n−1)-th row from time tc0 to time tc1 in a (k+1)-th frame, the data driver circuit 510 may output the common data signal Dout with different three data voltages (i.e. n−1[2], n−1[3], n−1[1]) for driving the corresponding three pixels of the (n−1)-th row. Moreover, the clock signals CKH_2, CKH_3, and CKH_1 may be sequentially changed from the low voltage level to the high voltage level to sequentially turn-on the switch transistors M2, M3 and M1 during the period from time tc0 to time tc1, and the de-multiplexer 520 may sequentially provide the data voltages (i.e. n−1[2], n−1[3], n−1[1]) to the data signal lines DL_(m+1), DL_(m+2) and DL_m, and the data voltages (i.e. n−1[2], n−1[3], n−1[1]) may be stored into the corresponding data capacitors. Then, during a period at least partially overlapped with the period of the clock signal CKH_1 with the last clock waveform, the scan signal /SS_(n−1) is changed from the high voltage level to the low voltage level, and the data voltages (i.e. n−1[2], n−1[3], n−1[1]) stored in the corresponding data capacitors may be written to the gate voltages of the control terminals of the driving transistors of the three pixels of the (n−1)-th row. Moreover, the period of the scan waveform of the scan signal /SS_(n−1) having the low voltage level is started after a start of the last clock waveform of the clock signal CKH_1 having the high voltage level. Thus, the three pixels of the (n−1)-th row may have the correct brightness in the (k+1)-th frame according to the corresponding gate voltages when the three pixels of the (n−1)-th row are operated in the LED on state. During a scan period of the pixels of the n-th row from time tc1 to time tc2 in the (k+1)-th frame and a scan period of the pixels of the (n+1)-th row from time tc2 to time tc3 in the (k+1)-th frame, the waveform change relationships of the clock signals CKH_1, CKH_2, CKH_3, the scan signals /SS_n and /SS_(n+1) may be deduced by analogy.

Therefore, the turn-on sequences of the switch transistors M1, M2 and M3 in the scan periods of the (n−1)-th, n-th and (n+1)-th rows of the pixels are different frame by frame.

Figure 7:
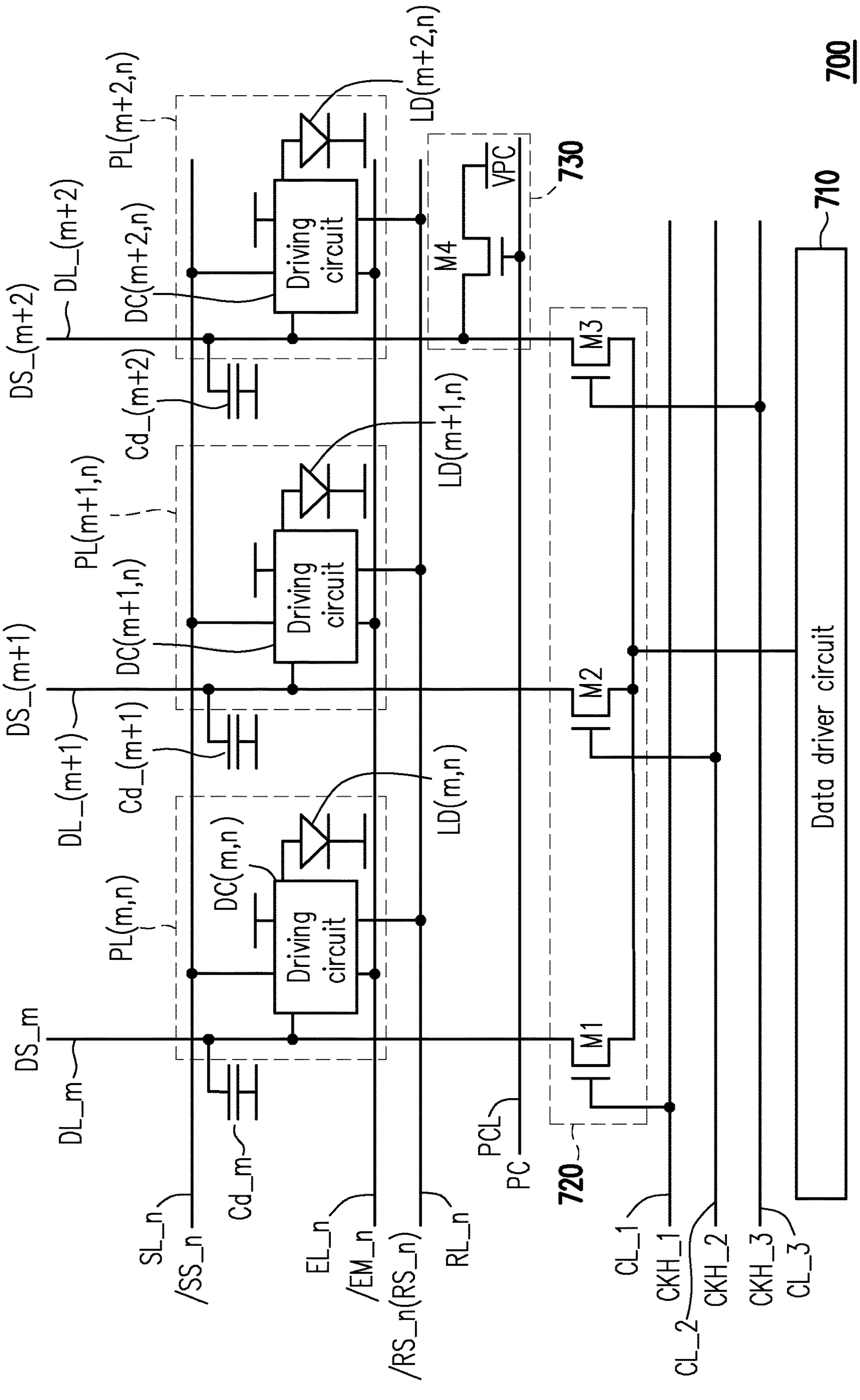
FIG. 7 is a schematic diagram of a display device according to an embodiment of the disclosure.

FIG. 7 is a schematic diagram of a display device according to an embodiment of the disclosure. Referring to FIG. 7, taking one data driving circuit driving three adjacent pixels in the same row as an example, the display device 700 includes a data driver circuit 710, a de-multiplexer 720, a pre-charge circuit 730, three pixels PL(m,n), PL(m+1,n) and PL(m+2,n), three data capacitors Cd_m, Cd_(m+1) and Cd_(m+2), three data signal lines DL_m, DL_(m+1) and DL_(m+2), a scan signal line SL_n, an emission signal line EL_n, a reset signal line RL_n, three clock signal lines CL_1, CL_2 and CL_3 and a pre-charge control line PCL. In the embodiment of the disclosure, the specific circuit architectures of pixels PL(m,n), PL(m+1,n) and PL(m+2,n) may be implemented in the same way as the pixel PL of FIG. 2, FIG. 3 or FIG. 16 respectively. The pre-charge circuit 730 is electrically connected to the data signal line DL_(m+2). The pre-charge circuit 730 is configured to pre-charge the data signal line DL_(m+2).

In the embodiment of the disclosure, the pixel PL(m,n) includes a driving circuit DC(m,n) and a light emitting diode LD(m,n), the pixel PL(m+1,n) includes a driving circuit DC(m+1,n) and a light emitting diode LD(m+1,n), and the pixel PL(m+2,n) includes a driving circuit DC(m+2,n) and a light emitting diode LD(m+2,n). The driving circuits DC(m,n), DC(m+1,n) and DC(m+2,n) are electrically connected to the scan signal line SL_n, the emission signal line EL_n and the reset signal line RL_n, so as to receive a scan signal /SS_n, an emission signal /EM_n and a reset signal /RS_n (or a reset signal RS_n which is opposite to the waveform of the reset signal /RS_n). The driving circuit DC(m,n) is further electrically connected to the light emitting diode LD(m,n) and the data capacitor Cd_m, and is further electrically connected to the data signal line DL_m to receive a data signal DS_m. The driving circuit DC(m+1,n) is further electrically connected to the light emitting diode LD(m+1,n) and the data capacitor Cd_(m+1), and is further electrically connected to the data signal line DL_(m+1) to receive a data signal DS_(m+1). The driving circuit DC(m+2,n) is further electrically connected to the light emitting diode LD(m+2,n) and the data capacitor Cd_(m+2), and is further electrically connected to the data signal line DL_(m+2) to receive a data signal DS_(m+2). In addition, in one embodiment of the disclosure, the pixels PL(m,n), PL(m+1,n) and PL(m+2,n) may further electrically connected to a compensation signal line (not shown) to receive a compensation signal.

In the embodiment of the disclosure, the de-multiplexer 720 includes three switch transistors M1, M2 and M3. It should be noted that the number of the switch transistors in the de-multiplexer 720 is determined by the number of pixels in different columns driven by the data driver circuit 710. A first terminal of the switch transistor M1 is electrically connected to the pixel PL(m,n) through the data signal line DL_m. A second terminal of the switch transistor M1 is electrically connected to the data driver circuit 710. A control terminal of the switch transistor M1 is electrically connected to the clock signal line CL_1, so as to receive a clock signal CKH_1. The switch transistor M1 is controlled by the clock signal CKH_1. A first terminal of the switch transistor M2 is electrically connected to the pixel PL(m+1,n) through the data signal line DL_(m+1). A second terminal of the switch transistor M2 is electrically connected to the data driver circuit 710. A control terminal of the switch transistor M2 is electrically connected to the clock signal line CL_2, so as to receive a clock signal CKH_2. The switch transistor M2 is controlled by the clock signal CKH_2. A first terminal of the switch transistor M3 is electrically connected to the pixel PL(m+2,n) through the data signal line DL_(m+2). A second terminal of the switch transistor M3 is electrically connected to the data driver circuit 710. A control terminal of the switch transistor M3 is electrically connected to the clock signal line CL_3, so as to receive a clock signal CKH_3. The switch transistor M3 is controlled by the clock signal CKH_3.

In the embodiment of the disclosure, the pre-charge circuit 730 includes a pre-charge transistor M4. A control terminal of the pre-charge transistor M4 is electrically connected to the pre-charge control line PCL, so as to receive the pre-charge control signal PC. A first terminal of the pre-charge transistor M4 receives a pre-charge voltage VPC. A second terminal of the pre-charge transistor M4 is electrically connected to the data signal line DL_(m+2). In the embodiment of the disclosure, the switch transistors M1, M2 and M3 and the pre-charge transistor M4 may be N-type transistors, but the disclosure is not limited thereto. In one embodiment of the disclosure, the switch transistors M1, M2 and M3 may be P-type transistors.

In the embodiment of the disclosure, the data driver circuit 710 may output a common data signal to the de-multiplexer 720, and the de-multiplexer 720 may output the data signals DS_m, DS_(m+1) and DS_(m+2) through the data signal lines DL_m, DL_(m+1) and DL_(m+2) according to the clock signals CKH_1, CKH_2, and CKH_3 and the common data signal. The switch transistors M1, M2 and M3 may be turned-on in time-dividing manner, so as to divide the common data signal to generate the data signals DS_m, DS_(m+1) and DS_(m+2). In the embodiment of the disclosure, the pre-charge circuit 730 may pre-charge the data signal line DL_(m+2) according to the pre-charge control signal PC and the pre-charge voltage VPC before the de-multiplexer 720 outputs the data signal DS_(m+2) to the data signal line DL_(m+2).

Figure 8:
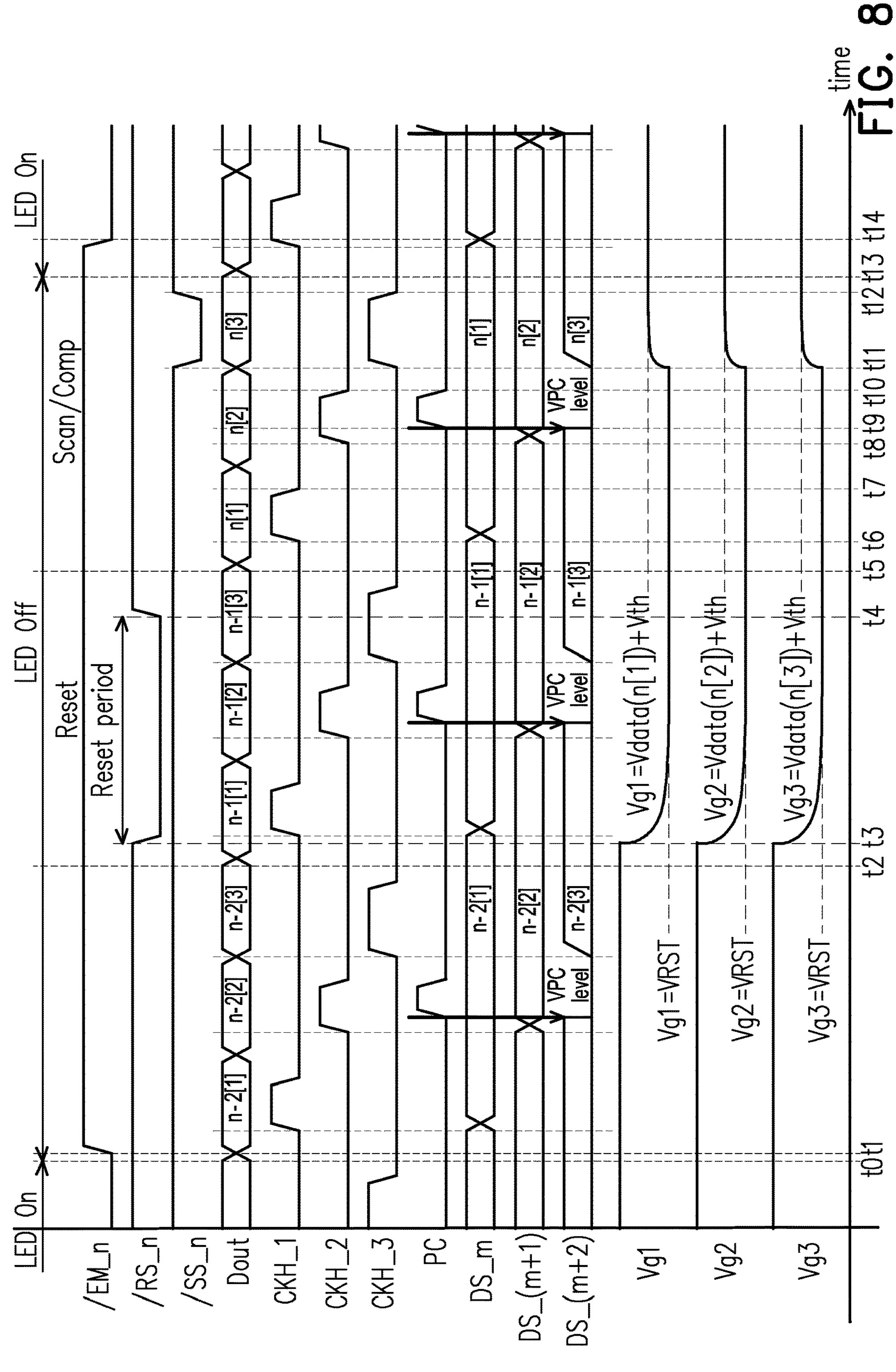
FIG. 8 is a schematic diagram of waveforms of a plurality of related signals according to an embodiment of the disclosure.

FIG. 8 is a schematic diagram of waveforms of a plurality of related signals according to an embodiment of the disclosure. Referring to FIG. 7 and FIG. 8, the display device 700 of FIG. 7 may be operated according to the signals of FIG. 8. During a period from time t0 to time t13, the pixels PL(m,n), PL(m+1,n) and PL(m+2,n) may be operated in LED off state. During a period from time t1 to time t14, the emission signal /EM_n is changed to a high voltage level, and the light emitting diodes of the pixels PL(m,n), PL(m+1,n) and PL(m+2,n) may be turned-off (because the emission transistors T3 and T5 in FIG. 2 and FIG. 3 is turned-off). During a period from time t2 to time t5, the pixels PL(m,n), PL(m+1,n) and PL(m+2,n) may be operated in a reset mode. During a reset period from time t3 to time t4, the reset signal /RS is changed from the high voltage level to the low voltage level, and the gate voltages Vg1, Vg2 and Vg3 of the control terminals of the driving transistors (i.e. the driving transistor T1 in FIG. 2 and FIG. 3) of the pixels PL(m,n), PL(m+1,n) and PL(m+2,n) may be reset to the reset voltage VRST (because the reset transistor T6 in FIG. 2 and FIG. 3 is turned-on). During a period from time t5 to time t13, the pixels PL(m,n), PL(m+1,n) and PL(m+2,n) may be operated in a scan/compensation mode. During a period from time t5 to time t13, the data driver circuit 710 may provide a common data signal Dout, and the common data signal Dout sequentially changes to three data voltages (i.e. n[1], n[2], n[3]).

During a period from time t0 to time t7, the clock signal CKH_1 is changed from the low voltage level to the high voltage level, and the switch transistor M1 is turned-on. Thus, the data signal line DL_m may transmit the data signal DS_m with the data voltage (n[1]) to the pixel PL(m,n), and store the data voltage (n[1]) into the data capacitor Cd_m. During a period from time t8 to time t10, the clock signal CKH_2 is changed from the low voltage level to the high voltage level, and the switch transistor M2 is turned-on. Thus, the data signal line DL_(m+1) may transmit the data signal DS_(m+1) with the data voltage (n[2]) to the pixel PL(m+1,n), and store the data voltage (n[2]) into the data capacitor Cd_(m+1). During a pre-charge period from time t9 to time t10, the pre-charge control signal PC is changed from the low voltage level to the high voltage level, and the pre-charge transistor M4 is turned-on. Thus, the voltage of the data signal line DL_(m+2) may be reset to a pre-charge voltage VPC level. During a period from time t11 to time t12, the clock signal CKH_3 is changed from the low voltage level to the high voltage level, and the switch transistor M3 is turned-on. Thus, the voltage of the data signal line DL_(m+2) is changed from the pre-charge voltage VPC to the data voltage (n[3]). The data signal line DL_(m+2) may transmit the data signal DS_(m+2) with the data voltage (n[3]) to the pixel PL(m+2,n), and store the data voltage (n[3]) into the data capacitor Cd_(m+2). In other words, the pre-charge circuit 730 pre-charges the data signal line DL_(m+2) electrically connected to the switch transistor M3 receiving the clock signal CKH_3 with the last clock waveform during the pre-charge period from time t9 to time t10. It should be noted that in FIG. 8, the pre-charge period from time t9 to time t10 is overlapping to a part of the period from time t8 to time t10 of the clock signal CKH_2. Hence, any additional time for the pre-charging may be not necessary, and a timing margin can be enough to extend for the clock signals CKH's and the scan signal /SS_n, and the period of the scan/compensation mode can be used effectively.

During a period from time t11 to time t12, the scan signal /SS is changed from the high voltage level to the low voltage level, and the scan transistor T2 is turned-on, the data voltage (n[1]) in the data capacitor Cd_m and the data voltage (n[2]) in the data capacitor Cd_(m+1) may transmit into the pixel PL(m,n) and PL(m+1,n) respectively, and also the compensation transistor T4 is turned-on, and the driving transistor T1 forms a diode connection. Therefore, by the diode clamp effect, the gate voltage Vg1 of the control terminal of the driving transistor (i.e. the driving transistor T1 in FIG. 2 and FIG. 3) of the pixel PL(m,n) may be changed to the voltage of a data voltage (n[1]) plus a threshold voltage Vth of driving transistor. The gate voltage Vg2 of the control terminal of the driving transistor (i.e. the driving transistor T1 in FIG. 2 and FIG. 3) of the pixel PL(m+1,n) may be changed to the voltage of a data voltage (n[2]) plus the threshold voltage Vth of driving transistor. The gate voltage Vg3 of the control terminal of the driving transistor (i.e. the driving transistor T1 in FIG. 2 and FIG. 3) of the pixel PL(m+2,n) may be changed to the voltage of a data voltage (n[3]) plus the threshold voltage Vth of driving transistor. That is, the period (i.e. time t11 to time t12) of the scan waveform (i.e. the waveform of the low voltage level) of the scan signal /SS is overlapped with the period (i.e. time t11 to time t12) of clock signal CKH_3 with a last clock waveform. By using pre-charge function to the data line for clock signal CKH_3, the "Reverse operation impossible" issue can be reduced if the scan signal /SS is earlier than clock signal CKH_3 or the scan signal /SS starts with the clock signal CKH_3. Therefore, the light emitting diodes of the pixels PL(m,n), PL(m+1,n) and PL(m+2,n) may have the correct brightness according to the gate voltages Vg1, Vg2 and Vg3 when the pixels PL(m,n), PL(m+1,n) and PL(m+2,n) are operated in the LED on state (i.e. after time t14).

Figure 9:
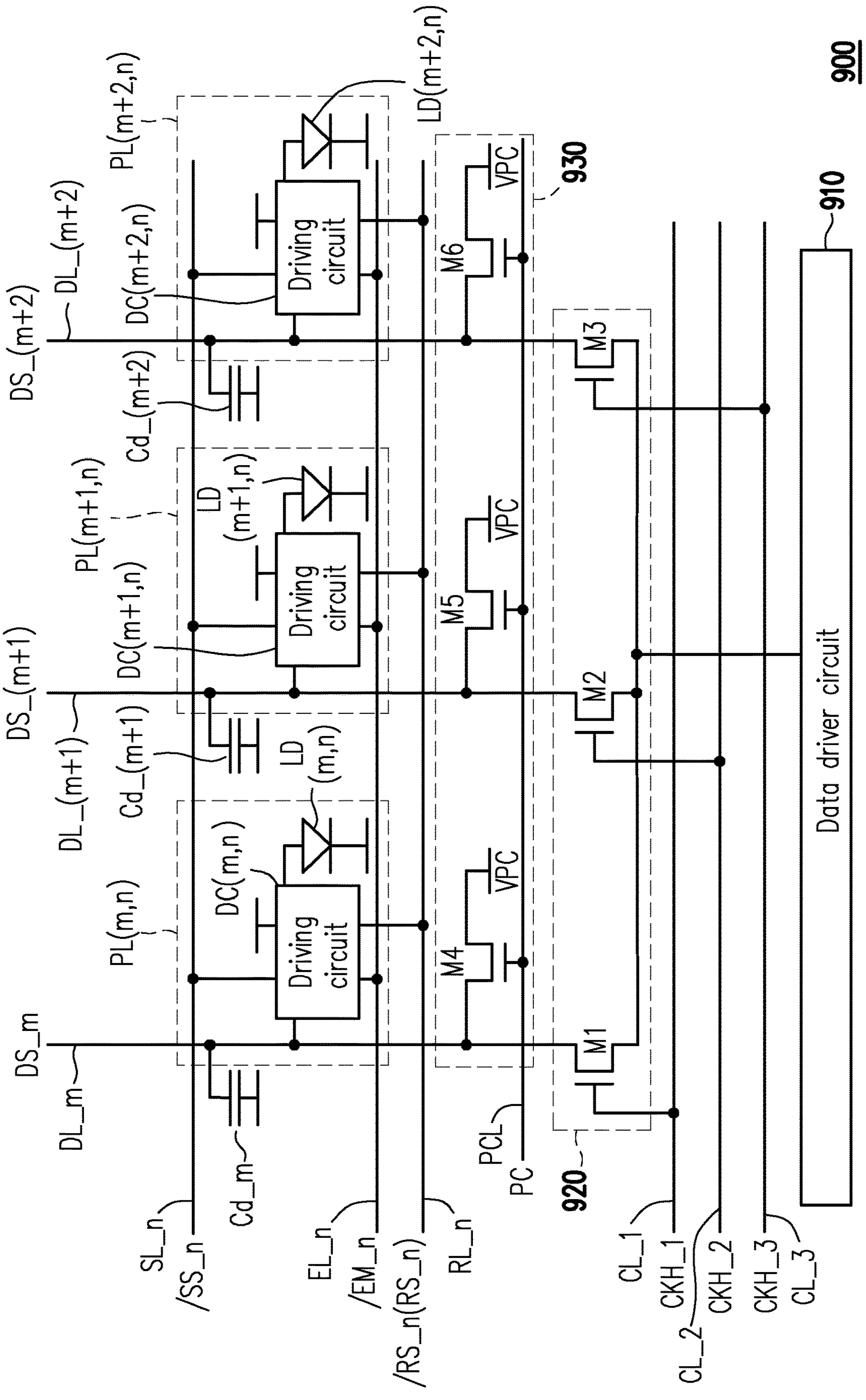
FIG. 9 is a schematic diagram of a display device according to an embodiment of the disclosure.

FIG. 9 is a schematic diagram of a display device according to an embodiment of the disclosure. Referring to FIG. 9, taking one data driving circuit driving three adjacent pixels in the same row as an example, the display device 900 includes a data driver circuit 910, a de-multiplexer 920, a pre-charge circuit 930, three pixels PL(m,n), PL(m+1,n) and PL(m+2,n), three data signal lines DL_m, DL_(m+1) and DL_(m+2), a scan signal line SL_n, an emission signal line EL_n, a reset signal line RL_n, three clock signal lines CL_1, CL_2 and CL_3 and a pre-charge control line PCL. In the embodiment of the disclosure, the specific circuit architectures of the pixels PL(m,n), PL(m+1,n) and PL(m+2,n) may be implemented in the same way as the pixel PL of FIG. 2, FIG. 3 or FIG. 16 respectively. The pre-charge circuit 930 is electrically connected to the data signal lines DL_m, DL_(m+1) and DL_(m+2). The pre-charge circuit 930 is configured to pre-charge the data signal lines DL_m, DL_(m+1) and DL_(m+2).

In the embodiment of the disclosure, the pixel PL(m,n) includes a driving circuit DC(m,n) and a light emitting diode LD(m,n), the pixel PL(m+1,n) includes a driving circuit DC(m+1,n) and a light emitting diode LD(m+1,n), and the pixel PL(m+2,n) includes a driving circuit DC(m+2,n) and a light emitting diode LD(m+2,n). The driving circuits DC(m,n), DC(m+1,n) and DC(m+2,n) are electrically connected to the scan signal line SL_n, the emission signal line EL_n and the reset signal line RL_n, so as to receive a scan signal /SS_n, an emission signal /EM_n and a reset signal /RS_n (or a reset signal RS_n which is opposite to the waveform of the reset signal /RS_n). The driving circuit DC(m,n) is further electrically connected to the light emitting diode LD(m,n), and is further electrically connected to the data signal line DL_m to receive a data signal DS_m. The driving circuit DC(m+1,n) is further electrically connected to the light emitting diode LD(m+1,n), and is further electrically connected to the data signal line DL_(m+1) to receive a data signal DS_(m+1). The driving circuit DC(m+2,n) is further electrically connected to the light emitting diode LD(m+2,n), and is further electrically connected to the data signal line DL_(m+2) to receive a data signal DS_(m+2). In addition, in one embodiment of the disclosure, the pixels PL(m,n), PL(m+1,n) and PL(m+2,n) may further electrically connected to a compensation signal line (not shown) to receive a compensation signal.

In the embodiment of the disclosure, the de-multiplexer 920 includes three switch transistors M1, M2 and M3. It should be noted that the number of the switch transistors in the de-multiplexer 920 is determined by the number of pixels in different columns driven by the data driver circuit 910. A first terminal of the switch transistor M1 is electrically connected to the pixel PL(m,n) through the data signal line DL_m. A second terminal of the switch transistor M1 is electrically connected to the data driver circuit 910. A control terminal of the switch transistor M1 is electrically connected to the clock signal line CL_1, so as to receive a clock signal CKH_1. The switch transistor M1 is controlled by the clock signal CKH_1. A first terminal of the switch transistor M2 is electrically connected to the pixel PL(m+1,n) through the data signal line DL_(m+1). A second terminal of the switch transistor M2 is electrically connected to the data driver circuit 910. A control terminal of the switch transistor M2 is electrically connected to the clock signal line CL_2, so as to receive a clock signal CKH_2. The switch transistor M2 is controlled by the clock signal CKH_2. A first terminal of the switch transistor M3 is electrically connected to the pixel PL(m+2,n) through the data signal line DL_(m+2). A second terminal of the switch transistor M3 is electrically connected to the data driver circuit 910. A control terminal of the switch transistor M3 is electrically connected to the clock signal line CL_3, so as to receive a clock signal CKH_3. The switch transistor M3 is controlled by the clock signal CKH_3. In the embodiment of the disclosure, the switch transistors M1, M2 and M3 may be N-type transistors, but the disclosure is not limited thereto. In one embodiment of the disclosure, the switch transistors M1, M2 and M3 may be P-type transistors.

In the embodiment of the disclosure, the pre-charge circuit 930 includes three pre-charge transistors M4, M5 and M6. The control terminals of the pre-charge transistors M4, M5 and M6 are electrically connected to the pre-charge control line PCL, so as to receive the pre-charge control signal PC. The first terminals of the pre-charge transistors M4, M5 and M6 receive a pre-charge voltage VPC. The second terminal of the pre-charge transistor M4 is electrically connected to the data signal line DL_m. The second terminal of the pre-charge transistor M5 is electrically connected to the data signal line DL_(m+1). The second terminal of the pre-charge transistor M6 is electrically connected to the data signal line DL_(m+2). In the embodiment of the disclosure, the pre-charge transistors M4, M5 and M6 may be N-type transistors, but the disclosure is not limited thereto. In one embodiment of the disclosure, the pre-charge transistors M4, M5 and M6 may be P-type transistors.

In the embodiment of the disclosure, the data driver circuit 910 may output a common data signal to the de-multiplexer 920, and the de-multiplexer 920 may output the data signals DS_m, DS_(m+1) and DS_(m+2) through the data signal lines DL_m, DL_(m+1) and DL_(m+2) according to the clock signals CKH_1, CKH_2, and CKH_3 and the common data signal. The switch transistors M1, M2 and M3 may be turned-on in time-dividing manner, so as to divide the common data signal to generate the data signals DS_m, DS_(m+1) and DS_(m+2). In the embodiment of the disclosure, the pre-charge circuit 930 may pre-charge the data signal lines DL_m, DL_(m+1) and DL_(m+2) according to the pre-charge control signal PC and the pre-charge voltage VPC before the de-multiplexer 920 outputs the data signals DS_m, DS_(m+1) and DS_(m+2) to the data signal lines DL_m, DL_(m+1) and DL_(m+2).

Figure 10:
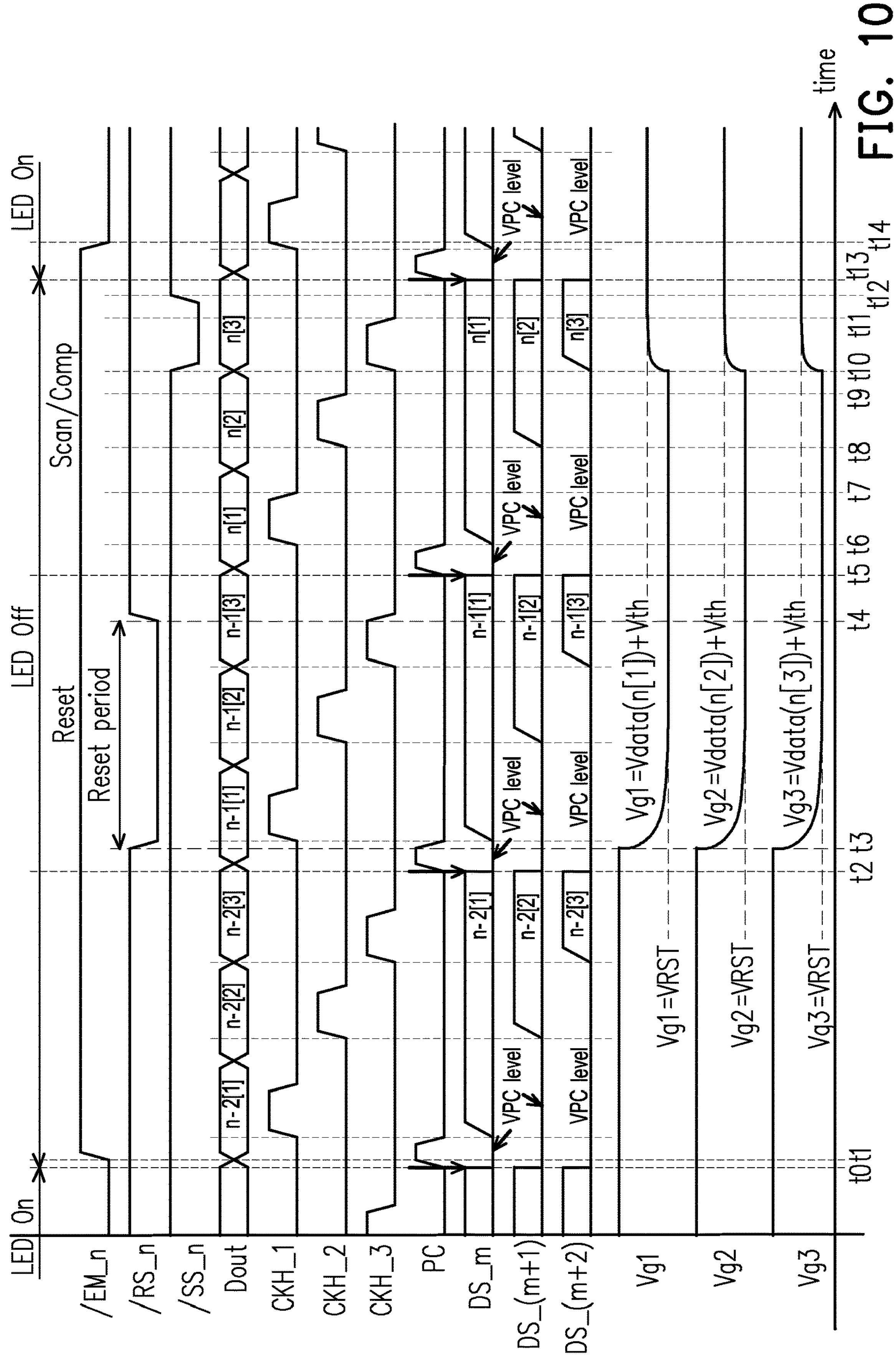
FIG. 10 is a schematic diagram of waveforms of a plurality of related signals according to an embodiment of the disclosure.

FIG. 10 is a schematic diagram of waveforms of a plurality of related signals according to an embodiment of the disclosure. Referring to FIG. 9 and FIG. 10, the display device 900 of FIG. 9 may be operated according to the signals of FIG. 10. During a period from time t0 to time t13, the pixels PL(m,n), PL(m+1,n) and PL(m+2,n) may be operated in LED off state. During a period from time t1 to time t14, the emission signal /EM_n is changed to a high voltage level, and the light emitting diodes of the pixels PL(m,n), PL(m+1,n) and PL(m+2,n) may be turned-off (because the emission transistors T3 and T5 in FIG. 2 and FIG. 3 is turned-off). During a period from time t2 to time t5, the pixels PL(m,n), PL(m+1,n) and PL(m+2,n) may be operated in a reset mode. During a reset period from time t3 to time t4, the reset signal /RS is changed from the high voltage level to the low voltage level, and the gate voltages Vg1, Vg2 and Vg3 of the control terminals of the driving transistors (i.e. the driving transistor T1 in FIG. 2 and FIG. 3) of the pixels PL(m,n), PL(m+1,n) and PL(m+2,n) may be reset to the reset voltage VRST (because the reset transistor T6 in FIG. 2 and FIG. 3 is turned-on). During a period from time t5 to time t13, the pixels PL(m,n), PL(m+1,n) and PL(m+2,n) may be operated in a scan/compensation mode. During a period from time t5 to time t13, the data driver circuit 910 may provide a common data signal Dout, and the common data signal Dout sequentially changes to three data voltages (i.e. n[1], n[2], n[3]).

During a pre-charge period from time t5 to time t6, the pre-charge control signal PC is changed from the low voltage level to the high voltage level, and the pre-charge transistors M4, M5 and M6 are turned-on. Thus, the data signal lines DL_m, DL_(m+1) and DL_(m+2) may be reset to a pre-charge voltage VPC level. In this embodiment, the pre-charge period is earlier than the periods of a plurality of clock waveforms of the clock signals. As shown in FIG. 10, during a period from time t6 to time t7, the clock signal CKH_1 is changed from the low voltage level to the high voltage level, and the switch transistor M1 is turned-on. Thus, the voltage of the data signal line DL_m is changed from the pre-charge voltage VPC to the data voltage (n[1]). The data signal line DL_m may transmit the data signal DS_m with the data voltage (n[1]) to the pixel PL(m,n), and store the data voltage (n[1]) into the data capacitor Cd_m. During a period from time t8 to time t9, the clock signal CKH_2 is changed from the low voltage level to the high voltage level, and the switch transistor M2 is turned-on. Thus, the voltage of the data signal line DL_(m+1) is changed from the pre-charge voltage VPC to the data voltage (n[2]). The data signal line DL_(m+1) may transmit the data signal DS_(m+1) with the data voltage (n[2]) to the pixel PL(m+1,n), and store the data voltage (n[2]) into the data capacitor Cd_(m+1). During a period from time t10 to time t11, the clock signal CKH_3 is changed from the low voltage level to the high voltage level, and the switch transistor M3 is turned-on. Thus, the voltage of the data signal line DL_(m+2) is changed from the pre-charge voltage VPC to the data voltage (n[3]). The voltage of the data signal line DL_(m+2) is changed from the pre-charge voltage VPC to the data voltage (n[3]), and the data signal line DL_(m+2) may transmit the data signal DS_(m+2) with the data voltage (n[3]) to the pixel PL(m+2,n), and store the data voltage (n[3]) into the data capacitor Cd_(m+2).

During a period from time t10 to time t12, the scan signal /SS is changed from the high voltage level to the low voltage level, and the scan transistor T2 is turned-on, the data voltage (n[1]) in the data capacitor Cd_m and the data voltage (n[2]) in the data capacitor Cd_(m+1) may transmit into the pixel PL(m,n) and PL(m+1,n) respectively, and also the compensation transistor T4 is turned-on, and the driving transistor T1 forms a diode connection. Therefore, by the diode clamp effect, the gate voltage Vg1 of the control terminal of the driving transistor (i.e. the driving transistor T1 in FIG. 2 and FIG. 3) of the pixel PL(m,n) may be changed to the voltage of a data voltage (n[1]) plus a threshold voltage Vth of driving transistor. And, by the same reason, the gate voltage Vg2 of the control terminal of the driving transistor (i.e. the driving transistor T1 in FIG. 2 and FIG. 3) of the pixel PL(m+1,n) may be changed to the voltage of a data voltage (n[2]) plus the threshold voltage Vth of driving transistor, and the gate voltage Vg3 of the control terminal of the driving transistor (i.e. the driving transistor T1 in FIG. 2 and FIG. 3) of the pixel PL(m+2,n) may be changed to the voltage of a data voltage (n[3]) plus the threshold voltage Vth of driving transistor. That is, the period (i.e. time t10 to time t12) of the scan waveform (i.e. the waveform of the low voltage level) of the scan signal /SS is overlapped with the period (i.e. time t10 to time t11) of clock signal CKH_3 with the last clock waveform. By using pre-charge function to the data line for clock signal CKH_3, the "Reverse operation impossible" issue can be reduced if the scan signal /SS is earlier than CKH_3 or the scan signal /SS starts with clock signal CKH_3. Therefore, the light emitting diodes of the pixels PL(m,n), PL(m+1,n) and PL(m+2,n) may have the correct brightness according to the gate voltages Vg1, Vg2 and Vg3 when the pixels PL(m,n), PL(m+1,n) and PL(m+2,n) are operated in the LED on state (i.e. after time t14).

Figure 11:
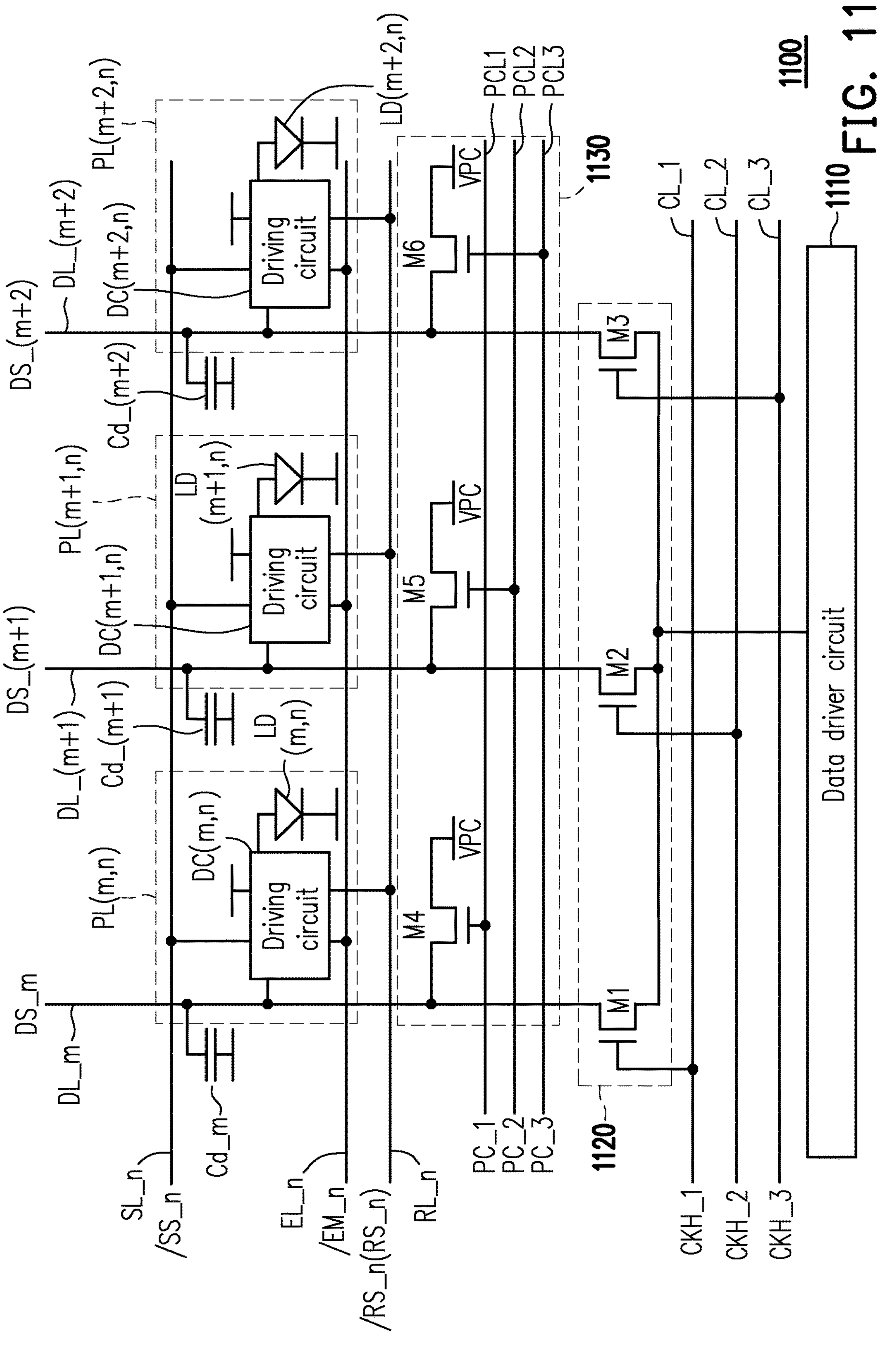
FIG. 11 is a schematic diagram of a display device according to an embodiment of the disclosure.

FIG. 11 is a schematic diagram of a display device according to an embodiment of the disclosure Referring to FIG. 11, taking one data driving circuit driving three adjacent pixels in the same row as an example, the display device 1100 includes a data driver circuit 1110, a de-multiplexer 1120, a pre-charge circuit 1130, three pixels PL(m,n), PL(m+1,n) and PL(m+2,n), three data capacitors Cd_m, Cd_(m+1) and Cd_(m+2), three data signal lines DL_m, DL_(m+1) and DL_(m+2), a scan signal line SL_n, an emission signal line EL_n, a reset signal line RL_n, three clock signal lines CL_1, CL_2 and CL_3 and three pre-charge control lines PCL1, PCL2 and PCL3. In the embodiment of the disclosure, the specific circuit architecture the pixels PL(m,n), PL(m+1,n) and PL(m+2,n) may be implemented in the same way as the pixel PL of FIG. 2, FIG. 3 or FIG. 16 respectively. The pre-charge circuit 1130 is electrically connected to the data signal lines DL_m, DL_(m+1) and DL_(m+2). The pre-charge circuit 1130 is configured to pre-charge the data signal lines DL_m, DL_(m+1) and DL_(m+2).

In the embodiment of the disclosure, the pixel PL(m,n) includes a driving circuit DC(m,n) and a light emitting diode LD(m,n), the pixel PL(m+1,n) includes a driving circuit DC(m+1,n) and a light emitting diode LD(m+1,n), and the pixel PL(m+2,n) includes a driving circuit DC(m+2,n) and a light emitting diode LD(m+2,n). The driving circuits DC(m,n), DC(m+1,n) and DC(m+2,n) are electrically connected to the scan signal line SL_n, the emission signal line EL_n and the reset signal line RL_n, so as to receive a scan signal /SS_n, an emission signal /EM_n and a reset signal /RS_n (or a reset signal RS_n which is opposite to the waveform of the reset signal /RS_n). The driving circuit DC(m,n) is further electrically connected to the light emitting diode LD(m,n), and is further electrically connected to the data signal line DL_m to receive a data signal DS_m. The driving circuit DC(m+1,n) is further electrically connected to the light emitting diode LD(m+1,n), and is further electrically connected to the data signal line DL_(m+1) to receive a data signal DS_(m+1). The driving circuit DC(m+2,n) is further electrically connected to the light emitting diode LD(m+2,n), and is further electrically connected to the data signal line DL_(m+2) to receive a data signal DS_(m+2). In addition, in one embodiment of the disclosure, the pixels PL(m,n), PL(m+1,n) and PL(m+2,n) may further electrically connected to a compensation signal line (not shown) to receive a compensation signal.

In the embodiment of the disclosure, the de-multiplexer 1120 includes three switch transistors M1, M2 and M3. It should be noted that the number of the switch transistors in the de-multiplexer 1120 is determined by the number of pixels in different columns driven by the data driver circuit 1110. A first terminal of the switch transistor M1 is electrically connected to the pixel PL(m,n) through the data signal line DL_m. A second terminal of the switch transistor M1 is electrically connected to the data driver circuit 1110. A control terminal of the switch transistor M1 is electrically connected to the clock signal line CL_1, so as to receive a clock signal CKH_1. The switch transistor M1 is controlled by the clock signal CKH_1. A first terminal of the switch transistor M2 is electrically connected to the pixel PL(m+1,n) through the data signal line DL_(m+1). A second terminal of the switch transistor M2 is electrically connected to the data driver circuit 1110. A control terminal of the switch transistor M2 is electrically connected to the clock signal line CL_2, so as to receive a clock signal CKH_2. The switch transistor M2 is controlled by the clock signal CKH_2. A first terminal of the switch transistor M3 is electrically connected to the pixel PL(m+2,n) through the data signal line DL_(m+2). A second terminal of the switch transistor M3 is electrically connected to the data driver circuit 1110. A control terminal of the switch transistor M3 is electrically connected to the clock signal line CL_3, so as to receive a clock signal CKH_3. The switch transistor M3 is controlled by the clock signal CKH_3. In the embodiment of the disclosure, the switch transistors M1, M2 and M3 may be N-type transistors, but the disclosure is not limited thereto. In one embodiment of the disclosure, the switch transistors M1, M2 and M3 may be P-type transistors.

In the embodiment of the disclosure, the pre-charge circuit 1130 includes three pre-charge transistors M4, M5 and M6. A control terminal of the pre-charge transistor M4 is electrically connected to the pre-charge control line PCL1, so as to receive a pre-charge control signal PC_1. A control terminal of the pre-charge transistor M5 is electrically connected to the pre-charge control line PCL2, so as to receive a charge control signal PC_2. A control terminal of the pre-charge transistor M6 is electrically connected to the pre-charge control line PCL3, so as to receive a charge control signal PC_3. The first terminals of the pre-charge transistors M4, M5 and M6 receive a pre-charge voltage VPC. The second terminal of the pre-charge transistor M4 is electrically connected to the data signal line DL_m. The second terminal of the pre-charge transistor M5 is electrically connected to the data signal line DL_(m+1). The second terminal of the pre-charge transistor M6 is electrically connected to the data signal line DL_(m+2). In the embodiment of the disclosure, the pre-charge transistors M4, M5 and M6 may be N-type transistors, but the disclosure is not limited thereto. In one embodiment of the disclosure, the pre-charge transistors M4, M5 and M6 may be P-type transistors.

In the embodiment of the disclosure, the data driver circuit 1110 may output a common data signal to the de-multiplexer 1120, and the de-multiplexer 1120 may output the data signals DS_m, DS_(m+1) and DS_(m+2) through the data signal lines DL_m, DL_(m+1) and DL_(m+2) according to the clock signals CKH_1, CKH_2, and CKH_3 and the common data signal. The switch transistors M1, M2 and M3 may be turned-on in time-dividing manner, so as to divide the common data signal to generate the data signals DS_m, DS_(m+1) and DS_(m+2). In the embodiment of the disclosure, the pre-charge circuit 1130 may pre-charge the data signal lines DL_m, DL_(m+1) and DL_(m+2) according to the pre-charge control signals PC_1, PC_2 and PC_3 and the pre-charge voltage VPC before the de-multiplexer 1120 outputs the data signals DS_m, DS_(m+1) and DS_(m+2) to the data signal lines DL_m, DL_(m+1) and DL_(m+2).

Figure 12:
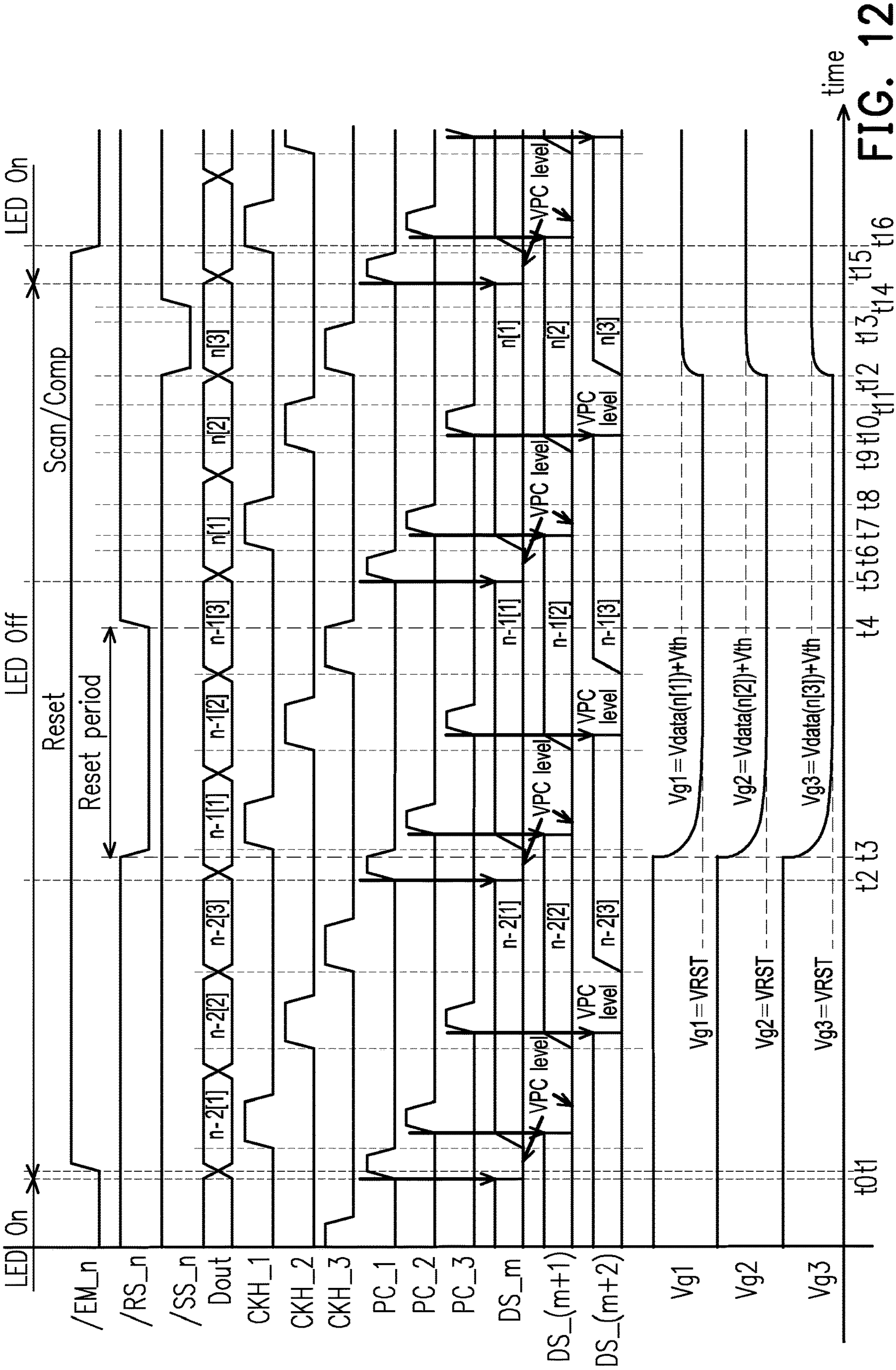
FIG. 12 is a schematic diagram of waveforms of a plurality of related signals according to an embodiment of the disclosure.

FIG. 12 is a schematic diagram of waveforms of a plurality of related signals according to an embodiment of the disclosure. Referring to FIG. 11 and FIG. 12, the display device 1100 of FIG. 11 may be operated according to the signals of FIG. 12. During a period from time t0 to time t15, the pixels PL(m,n), PL(m+1,n) and PL(m+2,n) may be operated in LED off state. During a period from time t1 to time t16, the emission signal /EM_n is changed to a high voltage level, and the light emitting diodes of the pixels PL(m,n), PL(m+1,n) and PL(m+2,n) may be turned-off (because the emission transistors T3 and T5 in FIG. 2 and FIG. 3 is turned-off). During a period from time t2 to time t5, the pixels PL(m,n), PL(m+1,n) and PL(m+2,n) may be operated in a reset mode. During a reset period from time t3 to time t4, the reset signal /RS is changed from the high voltage level to the low voltage level, and the gate voltages Vg1, Vg2 and Vg3 of the control terminals of the driving transistors (i.e. the driving transistor T1 in FIG. 2 and FIG. 3) of the pixels PL(m,n), PL(m+1,n) and PL(m+2,n) may be reset to the reset voltage VRST (because the reset transistor T6 in FIG. 2 and FIG. 3 is turned-on). During a period from time t5 to time t15, the pixels PL(m,n), PL(m+1,n) and PL(m+2,n) may be operated in a scan/compensation mode. During a period from time t5 to time t15, the data driver circuit 1110 may provide a common data signal Dout, and the common data signal Dout sequentially changes to three data voltages (i.e. n[1], n[2], n[3]).

In this embodiment, the plurality of pre-charge transistors M4, M5 and M6 are electrically connected to the plurality of data signal lines DL_m, DL_(m+1) and DL_(m+2), and configured to pre-charge the plurality of data signal lines DL_m, DL_(m+1) and DL_(m+2) according to different pre-charge control signals PC_1, PC_2 and PC_3 during a plurality of pre-charge periods, wherein the second to last pre-charge periods are overlapped with at least one period of a plurality of non-last clock waveforms of part of the plurality of clock signals. As shown in FIG. 12, during a pre-charge period from time t5 to time t6, the pre-charge control signal PC_1 is changed from the low voltage level to the high voltage level, and the pre-charge transistor M4 is turned-on. Thus, the data signal lines DL_m may be reset to a pre-charge voltage VPC level. During a period from time t6 to time t8, the clock signal CKH_1 is changed from the low voltage level to the high voltage level, and the switch transistor M1 is turned-on. Thus, the voltage of the data signal line DL_m is changed from the pre-charge voltage VPC to the data voltage (n[1]). The data signal line DL_m may transmit the data signal DS_m with the data voltage (n[1]) to the pixel PL(m,n), and store the data voltage (n[1]) into the data capacitor Cd_m.

During a pre-charge period from time t7 to time t8, the pre-charge control signal PC_2 is changed from the low voltage level to the high voltage level, and the pre-charge transistor M5 is turned-on. Thus, the data signal line DL_(m+1) may be reset to the pre-charge voltage VPC level. During a period from time t9 to time t11, the clock signal CKH_2 is changed from the low voltage level to the high voltage level, and the switch transistor M2 is turned-on. Thus, the voltage of the data signal line DL_(m+1) is changed from the pre-charge voltage VPC to the data voltage (n[2]). The data signal line DL_(m+1) may transmit the data signal DS_(m+1) with the data voltage (n[2]) to the pixel PL(m+1,n), and store the data voltage (n[2]) into the data capacitor Cd_(m+1).

During a pre-charge period from time t10 to time t11, the pre-charge control signal PC_3 is changed from the low voltage level to the high voltage level, and the pre-charge transistor M6 is turned-on. Thus, the data signal line DL_(m+2) may be reset to the pre-charge voltage VPC level. During a period from time t12 to time t13, the clock signal CKH_3 is changed from the low voltage level to the high voltage level, and the switch transistor M3 is turned-on.

Thus, the voltage of the data signal line DL_(m+2) is changed from the pre-charge voltage VPC to the data voltage (n[3]). The voltage of the data signal line DL_(m+2) is changed from the pre-charge voltage VPC to the data voltage (n[3]), and the data signal line DL_(m+2) may transmit the data signal DS_(m+2) with the data voltage (n[3]) to the pixel PL(m+2,n), and store the data voltage (n[3]) into the data capacitor Cd_(m+2).

During a period from time t12 to time t14, the scan signal /SS is changed from the high voltage level to the low voltage level, and the scan transistor T2 is turned-on, the data voltage (n[1]) in the data capacitor Cd_m and the data voltage (n[2]) in the data capacitor Cd_(m+1) may transmit into the pixel PL(m,n) and PL(m+1,n) respectively, and also, the compensation transistor T4 is turned-on, and the driving transistor T1 forms a diode connection. Therefore, by the diode clamp effect, the gate voltage Vg1 of the control terminal of the driving transistor (i.e. the driving transistor T1 in FIG. 2 and FIG. 3) of the pixel PL(m,n) may be changed to the voltage of a data voltage (n[1]) plus a threshold voltage Vth of driving transistor. And also by the same reason, the gate voltage Vg2 of the control terminal of the driving transistor (i.e. the driving transistor T1 in FIG. 2 and FIG. 3) of the pixel PL(m+1,n) may be changed to the voltage of a data voltage (n[2]) plus the threshold voltage Vth of driving transistor, and the gate voltage Vg3 of the control terminal of the driving transistor (i.e. the driving transistor T1 in FIG. 2 and FIG. 3) of the pixel PL(m+2,n) may be changed to the voltage of a data voltage (n[3]) plus the threshold voltage Vth of driving transistor. That is, the period (i.e. time t12 to time t14) of the scan waveform (i.e. the waveform of the low voltage level) of the scan signal /SS is overlapped with the period (i.e. time t12 to time t13) of clock signal CKH_3 with the last clock waveform. By using pre-charge function to the data line for CKH_3, "Reverse operation impossible" issue can be reduced if the scan signal /SS is earlier than the clock signal CKH_3 or the scan signal /SS starts with the clock signal CKH_3. Therefore, the light emitting diodes of the pixels PL(m,n), PL(m+1,n) and PL(m+2,n) may have the correct brightness according to the gate voltages Vg1, Vg2 and Vg3 when the pixels PL(m,n), PL(m+1,n) and PL(m+2,n) are operated in the LED on state (i.e. after time t16).

In the embodiment of the disclosure, at least one pre-charge period (i.e. the pre-charge period from time t7 to time t8 and the pre-charge period from time t10 to time t11) is overlapped with a period of a non-last clock waveform of one of the plurality of clock signals CKH_1 and CKH_2. It should be noted that in FIG. 12, the pre-charge period from time t7 to time t8 is overlapping to a part of the period from time t6 to time t8 of the clock signal CKH_2. And, the pre-charge period from time t10 to time t11 is overlapping to a part of the period from time t9 to time t11 of the clock signal CKH_3. Hence, any additional time for the pre-charging is not necessary for PC_2 and PC_3. Therefore, a timing margin can be enough to extend for the clock signals CKH's and the scan signal /SS_n, and the period of the scan/compensation mode can be used effectively.

Figure 13:
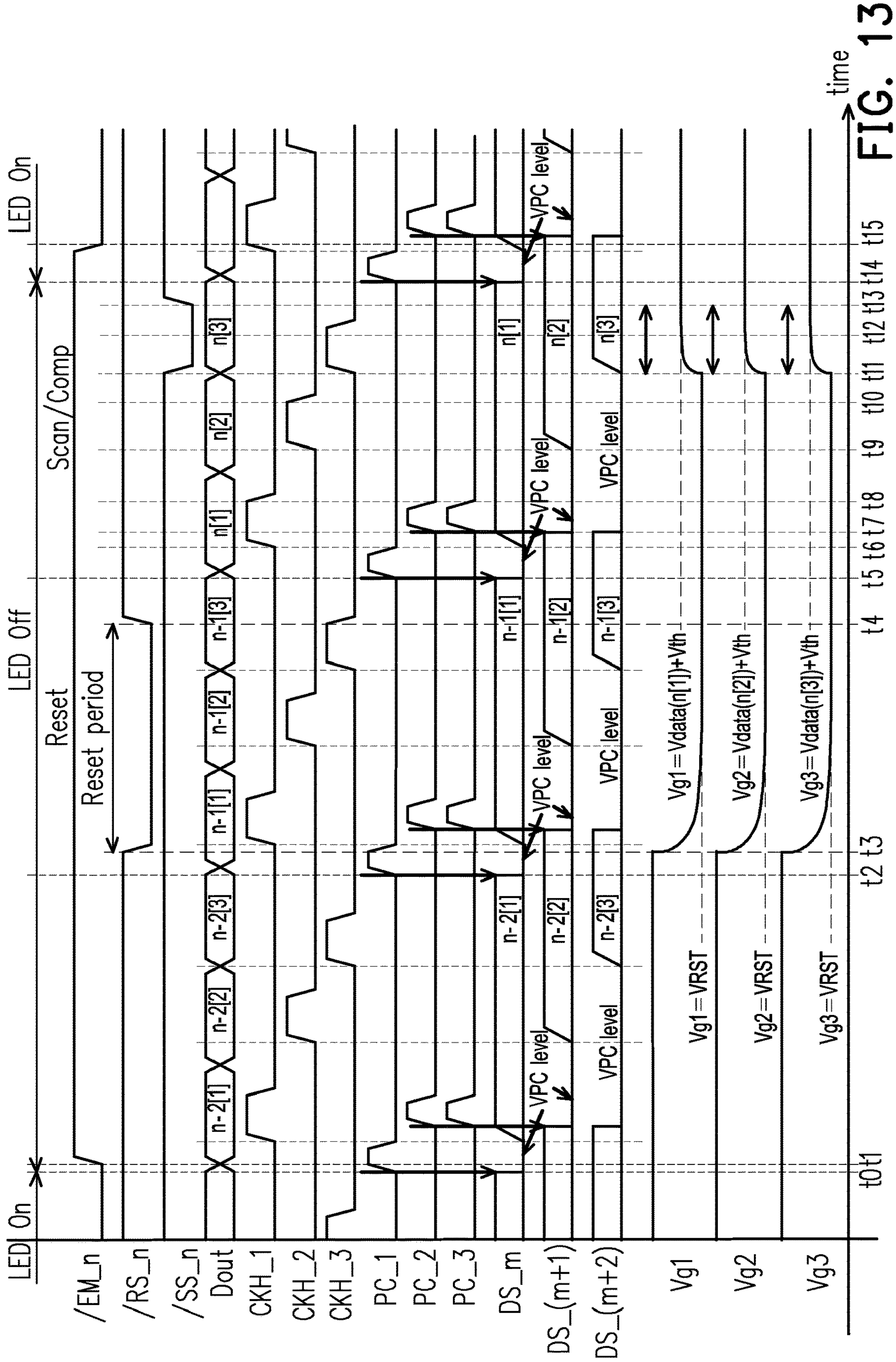
FIG. 13 is a schematic diagram of waveforms of a plurality of related signals according to an embodiment of the disclosure.

FIG. 13 is a schematic diagram of waveforms of a plurality of related signals according to an embodiment of the disclosure. Referring to FIG. 11 and FIG. 13, the display device 1100 of FIG. 11 may be operated according to the signals of FIG. 13. During a period from time t0 to time t14, the pixels PL(m,n), PL(m+1,n) and PL(m+2,n) may be operated in LED off state. During a period from time t1 to time t15, the emission signal /EM_n is changed to a high voltage level, and the light emitting diodes of the pixels PL(m,n), PL(m+1,n) and PL(m+2,n) may be turned-off (because the emission transistors T3 and T5 in FIG. 2 and FIG. 3 is turned-off). During a period from time t2 to time t5, the pixels PL(m,n), PL(m+1,n) and PL(m+2,n) may be operated in a reset mode. During a reset period from time t3 to time t4, the reset signal /RS is changed from the high voltage level to the low voltage level, and the gate voltages Vg1, Vg2 and Vg3 of the control terminals of the driving transistors (i.e. the driving transistor T1 in FIG. 2 and FIG. 3) of the pixels PL(m,n), PL(m+1,n) and PL(m+2,n) may be reset to the reset voltage VRST (because the reset transistor T6 in FIG. 2 and FIG. 3 is turned-on). During a period from time t5 to time t14, the pixels PL(m,n), PL(m+1,n) and PL(m+2,n) may be operated in a scan/compensation mode. During a period from time t5 to time t14, the data driver circuit 1110 may provide a common data signal Dout, and the common data signal Dout sequentially changes to three data voltages (i.e. n[1], n[2], n[3]).

During a pre-charge period from time t5 to time t6, the pre-charge control signal PC_1 is changed from the low voltage level to the high voltage level, and the pre-charge transistor M4 is turned-on. Thus, the data signal lines DL_m may be reset to a pre-charge voltage VPC level. During a period from time t6 to time t8, the clock signal CKH_1 is changed from the low voltage level to the high voltage level, and the switch transistor M1 is turned-on. Thus, the voltage of the data signal line DL_m is changed from the pre-charge voltage VPC to the data voltage (n[1]). The data signal line DL_m may transmit the data signal DS_m with the data voltage (n[1]) to the pixel PL(m,n), and store the data voltage (n[1]) into the data capacitor Cd_m.

During a pre-charge period from time t7 to time t8, the pre-charge control signals PC_2 and PC_3 are changed from the low voltage level to the high voltage level, and the pre-charge transistors M5 and M6 are turned-on. Thus, the data signal lines DL_(m+1) and DL_(m+2) may be reset to the pre-charge voltage VPC level. During a period from time t9 to time t10, the clock signal CKH_2 is changed from the low voltage level to the high voltage level, and the switch transistor M2 is turned-on. Thus, the voltage of the data signal line DL_(m+1) is changed from the pre-charge voltage VPC to the data voltage (n[2]). The data signal line DL_(m+1) may transmit the data signal DS_(m+1) with the data voltage (n[2]) to the pixel PL(m+1,n), and store the data voltage (n[2]) into the data capacitor Cd_(m+1). During a period from time t11 to time t12, the clock signal CKH_3 is changed from the low voltage level to the high voltage level, and the switch transistor M3 is turned-on. Thus, the voltage of the data signal line DL_(m+2) is changed from the pre-charge voltage VPC to the data voltage (n[3]). The voltage of the data signal line DL_(m+2) is changed from the pre-charge voltage VPC to the data voltage (n[3]), and the data signal line DL_(m+2) may transmit the data signal DS_(m+2) with the data voltage (n[3]) to the pixel PL(m+2,n), and store the data voltage (n[3]) into the data capacitor Cd_(m+2).

During a period from time t11 to time t13, the scan signal /SS is changed from the high voltage level to the low voltage level, and the scan transistor T2 is turned-on, the data voltage (n[1]) in the data capacitor Cd_m and the data voltage (n[2]) in the data capacitor Cd_(m+1) may transmit into the pixel PL(m,n) and PL(m+1,n) respectively, and also, the compensation transistor T4 is turned-on, and the driving transistor T1 forms a diode connection. Therefore, by the diode clamp effect, the gate voltage Vg1 of the control terminal of the driving transistor (i.e. the driving transistor T1 in FIG. 2 and FIG. 3) of the pixel PL(m,n) may be changed to the voltage of a data voltage (n[1]) plus a threshold voltage Vth of driving transistor. And also, by the same reason, the gate voltage Vg2 of the control terminal of the driving transistor (i.e. the driving transistor T1 in FIG. 2 and FIG. 3) of the pixel PL(m+1,n) may be changed to the voltage of a data voltage (n[2]) plus the threshold voltage Vth of driving transistor, and the gate voltage Vg3 of the control terminal of the driving transistor (i.e. the driving transistor T1 in FIG. 2 and FIG. 3) of the pixel PL(m+2,n) may be changed to the voltage of a data voltage (n[3]) plus the threshold voltage Vth of driving transistor. That is, the period (i.e. time t11 to time t13) of the scan waveform (i.e. the waveform of the low voltage level) of the scan signal /SS is overlapped with the period (i.e. time t11 to time t12) of clock signal CKH_3 with the last clock waveform. By using pre-charge function to the data line for CKH_3, "Reverse operation impossible" issue can be reduced if the scan signal /SS is earlier than the clock signal CKH_3 or the scan signal /SS starts with the clock signal CKH_3. Therefore, the light emitting diodes of the pixels PL(m,n), PL(m+1,n) and PL(m+2,n) may have the correct brightness according to the gate voltages Vg1, Vg2 and Vg3 when the pixels PL(m,n), PL(m+1,n) and PL(m+2,n) are operated in the LED on state (i.e. after time t15).

In the embodiment of the disclosure, the second to last pre-charge periods (i.e. the pre-charge period from time t7 to time t8 of the pre-charge control signals PC_2 and PC_3) are overlapped with at least one period (i.e. the period from time t5 to time t7 of the clock signal CKH_1) of a plurality of non-last clock waveforms of part of the plurality of clock signals (i.e. the clock signals CKH_2 and CKH_3). It should be noted that in FIG. 13, the pre-charge period from time t7 to time t8 is overlapping to a part of the period from time t6 to time t8 of the clock signal CKH_2. Hence, any additional time for the pre-charging is not necessary for PC_2 and PC_3. Therefore, a timing margin can be enough to extend for the clock signals CKH's and the scan signal /SS_n, and the period of the scan/compensation mode can be used effectively.

Figure 14:
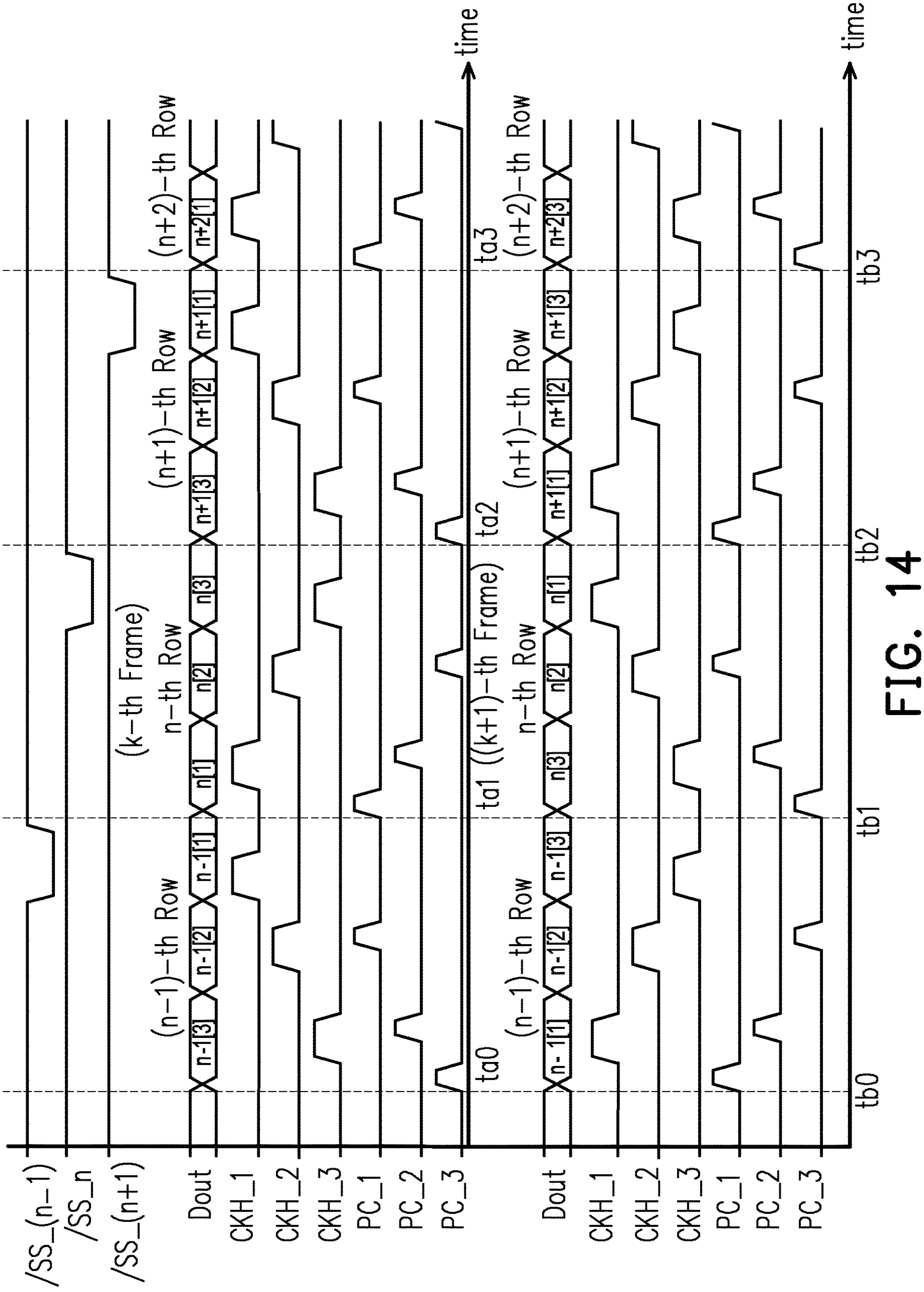
FIG. 14 is a schematic diagram of waveforms of a plurality of related signals according to an embodiment of the disclosure.

FIG. 14 is a schematic diagram of waveforms of a plurality of related signals according to an embodiment of the disclosure. Referring to FIG. 11 and FIG. 14, the display device 1100 of FIG. 11 may be operated according to the signals of FIG. 14. In the embodiment of the disclosure, the pixel array of the display device 1100 may include three groups of pixels, and the three groups of pixels are arranged in different rows (e.g. the (n−1)-th row, the n-th row and the (n+1)-th row). The pixels of the (n−1)-th row are electrically connected to the data signal lines DL_m, DL_(m+1) and DL_(m+2), and the pixels of the (n−1)-th row receive a scan signal /SS_(n−1) through the another scan signal line. The pixels of the n-th row are electrically connected to the data signal lines DL_m, DL_(m+1) and DL_(m+2), and the pixels of the n-th row receive the scan signal /SS_n through the scan signal line SL_n. The pixels of the (n+1)-th row are electrically connected to the data signal lines DL_m, DL_(m+1) and DL_(m+2), and the pixels of the (n+1)-th row receive a scan signal /SS_(n+1) through the yet another scan signal line. The switch transistors M1, M2 and M3 are electrically connected to the pixels of the (n−1)-th to (n+1)-th rows through the data signal lines DL_m, DL_(m+1) and DL_(m+2).

In the embodiment of the disclosure, a turn-on sequence of the switch transistors M1, M2 and M3 in a scan period of the pixels of the (n−1)-th row is different from a turn-on sequence of the plurality of the switch transistors M1, M2 and M3 in a scan period of the pixels of the n-th row, and the turn-on sequence of the switch transistors M1, M2 and M3 in a scan period of the pixels of the n-th row is also different from a turn-on sequence of the plurality of the switch transistors M1, M2 and M3 in a scan period of the pixels of the (n+1)-th row.

Specifically, during a scan period of the pixels of the (n−1)-th row from time ta0 to time ta1 in a k-th frame, the data driver circuit 1110 may output the common data signal Dout with different three data voltages (i.e. n−1[3], n−1[2], n−1[1]) for the corresponding three pixels of the (n−1)-th row. Moreover, the clock signals CKH_3, CKH_2, and CKH_1 may be sequentially changed from the low voltage level to the high voltage level to sequentially turn-on the switch transistors M3, M2 and M1 during the period from time ta0 to time ta1, and the de-multiplexer 1120 may sequentially provide the data voltages (i.e. n−1[3], n−1[2], n−1[1]) to the data signal lines DL_(m+2), DL_(m+1) and DL_m, and the data voltages (i.e. n−1[3], n−1[2], n−1[1]) may be stored into the corresponding data capacitors. Then, during a period at least partially overlapped with the period of the clock signal CKH_1 with a last clock waveform, the scan signal /SS_(n−1) is changed from the high voltage level to the low voltage level, and the data voltages (i.e. n−1[3], n−1[2], n−1[1]) stored in the corresponding data capacitors may be written to the gate voltages of the control terminals of the driving transistors of the three pixels of the (n−1)-th row. Thus, the three pixels PL(m,n−1), PL(m+1,n−1) and PL(m+2,n−1) of the (n−1)-th row may have the correct brightness according to the corresponding gate voltages when the three pixels of the (n−1)-th row are operated in the LED on state.

During a scan period of the pixels of the n-th row from time ta1 to time ta2 in the k-th frame, the data driver circuit 1110 may output the common data signal Dout with different three data voltages (i.e. n[1], n[2], n[3]) for the corresponding three pixels of the n-th row. Moreover, the clock signals CKH_1, CKH_2, and CKH_3 may be sequentially changed from the low voltage level to the high voltage level to sequentially turn-on the switch transistors M1, M2 and M3 during the period from time ta1 to time ta2, and the de-multiplexer 1120 may sequentially provide the data voltages (i.e. n[1], n[2], n[3]) to the data signal lines DL_m, DL_(m+1) and DL_(m+2), and the data voltages (i.e. n[1], n[2], n[3]) may be stored into the corresponding data capacitors. Then, during a period at least partially overlapped with the period of the clock signal CKH_3 with the last clock waveform, the scan signal /SS_n is changed from the high voltage level to the low voltage level, and the data voltages (i.e. n[1], n[2], n[3]) stored in the corresponding data capacitors may be written to the gate voltages of the control terminals of the driving transistors of the three pixels of the n-th row. Thus, the three pixels PL(m,n), PL(m+1,n) and PL(m+2,n) of the n-th row may have the correct brightness according to the corresponding gate voltages when the three pixels of the n-th row are operated in the LED on state.

During a scan period of the pixels of the (n+1)-th row from time ta2 to time ta3 in the k-th frame, the data driver circuit 1110 may output the common data signal Dout with different three data voltages (i.e. n+1[1], n+1[2], n+1[3]) for the corresponding three pixels of the (n+1)-th row. Moreover, the clock signals CKH_3, CKH_2, and CKH_1 may be sequentially changed from the low voltage level to the high voltage level to sequentially turn-on the switch transistors M3, M2 and M1 during the period from time ta2 to time ta3, and the de-multiplexer 1120 may sequentially provide the data voltages (i.e. n+1[3], n+1[2], n+1[2]) to the data signal lines DL_(m+2), DL_(m+1) and DL_m, and the data voltages (i.e. n+1[3], n+1[2], n+1[1]) may be stored into the corresponding data capacitors. Then, during a period at least partially overlapped with the period of the clock signal CKH_1 with the last clock waveform, the scan signal /SS_(n+1) is changed from the high voltage level to the low voltage level, and the data voltages (i.e. n+1[3], n+1[2], n+1[1]) stored in the corresponding data capacitors may be written to the gate voltages of the control terminals of the driving transistors of the three pixels of the n-th row. Thus, the three pixels PL(m,n+1), PL(m+1,n+1) and PL(m+2,n+1) of the (n+1)-th row may have the correct brightness in the (k−1)-th frame according to the corresponding gate voltages when the three pixels of the (n+1)-th row are operated in the LED on state. Therefore, the turn-on sequences of the switch transistors M1, M2 and M3 in the scan periods of the (n−1)-th, n-th and (n+1)-th rows of the pixels are different row by row.

During a scan period of the pixels of the (n−1)-th row from time tb0 to time tb1 in a (k+1)-th frame, the data driver circuit 1110 may output the common data signal Dout with different three data voltages (i.e. n−1[1], n−1[2], n−1[3]) for the corresponding three pixels of the (n−1)-th row. Moreover, the clock signals CKH_1, CKH_2, and CKH_3 may be sequentially changed from the low voltage level to the high voltage level to sequentially turn-on the switch transistors M1, M2 and M3 during the period from time tb0 to time tb1, and the de-multiplexer 1120 may sequentially provide the data voltages (i.e. n−1[1], n−1[2], n−1[3]) to the data signal lines DL_m, DL_(m+1) and DL_(m+2), and the data voltages (i.e. n−1[1], n−1[2], n−1[3]) may be stored into the corresponding data capacitors. Then, during a period at least partially overlapped with the period of the clock signal CKH_3 with the last clock waveform, the scan signal /SS_(n−1) is changed from the high voltage level to the low voltage level, and the data voltages (i.e. n−1[1], n−1[2], n−1[3]) stored in the corresponding data capacitors may be written to the gate voltages of the control terminals of the driving transistors of the three pixels of the (n−1)-th row. Thus, the three pixels of the (n−1)-th row may have the correct brightness in the (k+1)-th frame according to the corresponding gate voltages when the three pixels of the (n−1)-th row are operated in the LED on state. During a scan period of the pixels of the n-th row from time tb1 to time tb2 in the (k+1)-th frame and a scan period of the pixels of the (n+1)-th row from time tb2 to time tb3 in the (k+1)-th frame, the waveform change relationships of the clock signals CKH_1, CKH_2, CKH_3, the scan signals /SS_n and /SS_(n+1) may be deduced by analogy. Therefore, the turn-on sequences of the switch transistors M1, M2 and M3 in the scan periods of the (n−1)-th, n-th and (n+1)-th rows of the pixels are different frame by frame.

In the embodiment of the disclosure, a pre-charge sequence of the plurality of pre-charge periods the pre-charge transistors M4, M5 and M6 in a scan period of the pixels of the (n−1)-th row is different from a pre-charge sequence of the plurality of pre-charge periods the pre-charge transistors M4, M5 and M6 in a scan period of the pixels of the n-th row, and the pre-charge sequence of the plurality of pre-charge periods the pre-charge transistors M4, M5 and M6 in a scan period of the pixels of the n-th row is different from a pre-charge sequence of the plurality of pre-charge periods the pre-charge transistors M4, M5 and M6 in a scan period of the pixels of the (n+1)-th row.

Specifically, during the scan period of the pixels of the (n−1)-th row from time ta0 to time ta1 in a k-th frame, the pre-charge control signals PC_3, PC_2, and PC_1 may be sequentially changed from the low voltage level to the high voltage level to sequentially turn-on the pre-charge transistors M6, M5 and M4 during the period from time ta0 to time ta1, and the pre-charge circuit 1130 may sequentially reset the voltages of the data signal lines DL_(m+2), DL_(m+1) and DL_m. Moreover, the pre-charge period of the pre-charge control signal PC_1 (i.e. the period of the high voltage level waveform of the pre-charge control signal PC_1) is overlapped with the clock signal CKH_2 (i.e. the period of the high voltage level waveform of the clock signal CKH_2), and the pre-charge period of the pre-charge control signal PC_2 (i.e. the period of the high voltage level waveform of the pre-charge control signal PC_2) is overlapped with the clock signal CKH_3 (i.e. the period of the high voltage level waveform of the clock signal CKH_3).

During the scan period of the pixels of the n-th row from time ta1 to time ta2 in the k-th frame, the pre-charge control signals PC_1, PC_2, and PC_3 may be sequentially changed from the low voltage level to the high voltage level to sequentially turn-on the pre-charge transistors M4, M5 and M6 during the period from time ta1 to time ta2, and the pre-charge circuit 1130 may sequentially reset the voltages of the data signal lines DL_m, DL_(m+1) and DL_(m+2). Moreover, the pre-charge period of the pre-charge control signal PC_2 (i.e. the period of the high voltage level waveform of the pre-charge control signal PC_2) is overlapped with the clock signal CKH_1 (i.e. the period of the high voltage level waveform of the clock signal CKH_1), and the pre-charge period of the pre-charge control signal PC_3 (i.e. the period of the high voltage level waveform of the pre-charge control signal PC_3) is overlapped with the clock signal CKH_2 (i.e. the period of the high voltage level waveform of the clock signal CKH_2).

During the scan period of the pixels of the (n+1)-th row from time ta2 to time ta3 in the k-th frame, the pre-charge control signals PC_1, PC_2, and PC_3 may be sequentially changed from the low voltage level to the high voltage level to sequentially turn-on the pre-charge transistors M6, M5 and M4 during the period from time ta2 to time ta3, and the pre-charge circuit 1130 may sequentially reset the voltages of the data signal lines DL_(m+2), DL_(m+1) and DL_m. Moreover, the pre-charge period of the pre-charge control signal PC_1 (i.e. the period of the high voltage level waveform of the pre-charge control signal PC_1) is overlapped with the clock signal CKH_2 (i.e. the period of the high voltage level waveform of the clock signal CKH_2), and the pre-charge period of the pre-charge control signal PC_2 (i.e. the period of the high voltage level waveform of the pre-charge control signal PC_2) is overlapped with the clock signal CKH_3 (i.e. the period of the high voltage level waveform of the clock signal CKH_3).

Therefore, the pre-charge sequences of the pre-charge transistors M4, M5 and M6 in the scan periods of the (n−1)-th, n-th and (n+1)-th rows of the pixels are different row by row.

During the scan period of the pixels of the (n−1)-th row from time tb0 to time tb1 in the (k+1)-th frame, the pre-charge control signals PC_1, PC_2, and PC_3 may be sequentially changed from the low voltage level to the high voltage level to sequentially turn-on the pre-charge transistors M4, M5 and M6 during the period from time tb0 to time tb1, and the pre-charge circuit 1130 may sequentially reset the voltages of the data signal lines DL_m, DL_(m+1) and DL_(m+2). Moreover, the pre-charge period of the pre-charge control signal PC_2 (i.e. the period of the high voltage level waveform of the pre-charge control signal PC_2) is overlapped with the clock signal CKH_1 (i.e. the period of the high voltage level waveform of the clock signal CKH_1), and the pre-charge period of the pre-charge control signal PC_3 (i.e. the period of the high voltage level waveform of the pre-charge control signal PC_3) is overlapped with the clock signal CKH_2 (i.e. the period of the high voltage level waveform of the clock signal CKH_2).

During a scan period of the pixels of the n-th row from time tb1 to time tb2 in the (k+1)-th frame and a scan period of the pixels of the (n+1)-th row from time tb2 to time tb3 in the (k+1)-th frame, the waveform change relationships of the pre-charge control signals PC_1, PC_2, and PC_3 may be deduced by analogy.

Therefore, the pre-charge sequences of the pre-charge transistors M4, M5 and M6 in the scan periods of the (n−1)-th, n-th and (n+1)-th rows of the pixels are different frame by frame.

Figure 15:
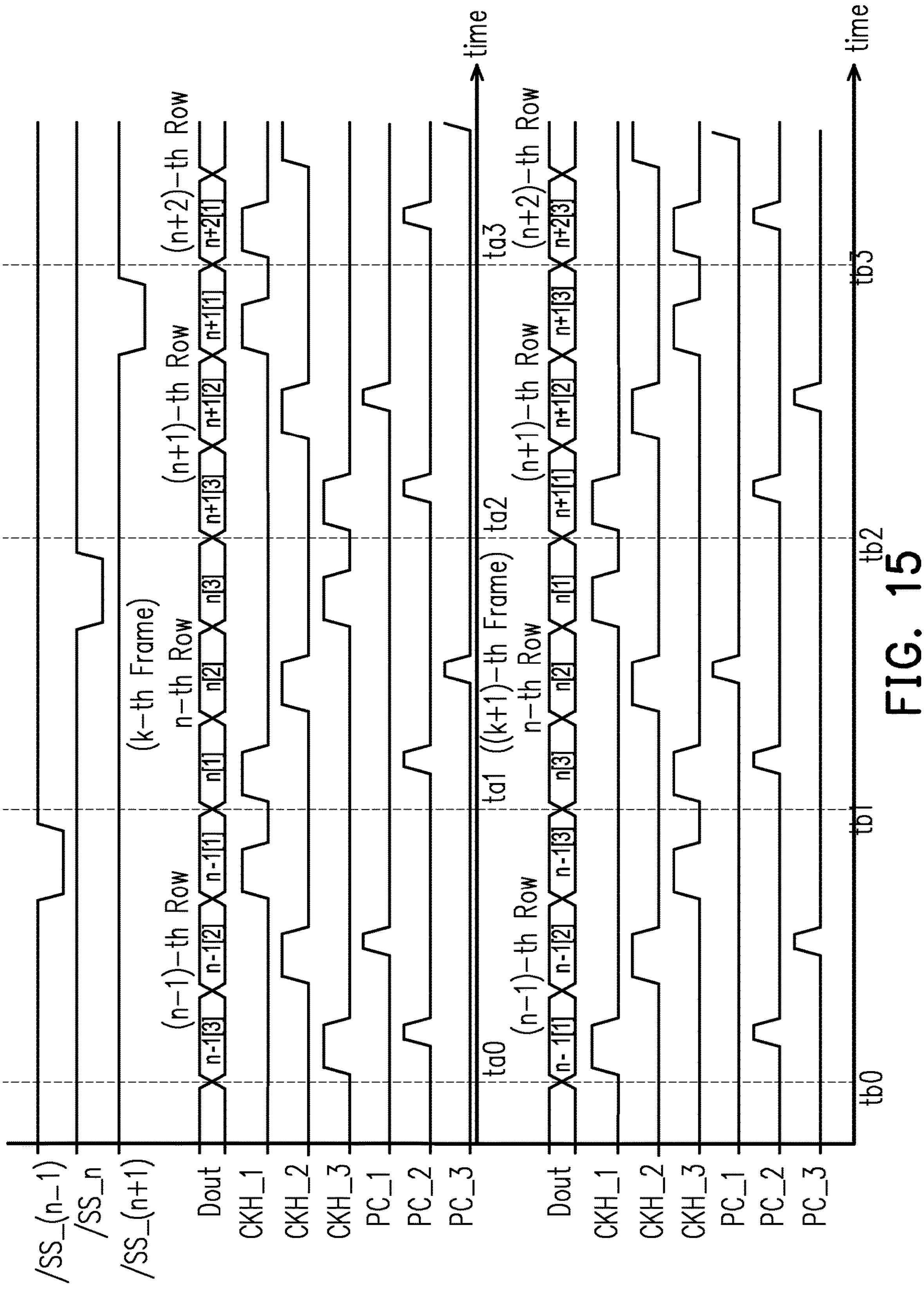
FIG. 15 is a schematic diagram of waveforms of a plurality of related signals according to an embodiment of the disclosure.

FIG. 15 is a schematic diagram of waveforms of a plurality of related signals according to an embodiment of the disclosure. Referring to FIG. 11 and FIG. 15, the display device 1100 of FIG. 11 may be operated according to the signals of FIG. 15. In the embodiment of the disclosure, the pixel array of the display device 1100 may include three groups of pixels, and the three groups of pixels are arranged in different rows (e.g. the (n−1)-th row, the n-th row and the (n+1)-th row). The pixels of the (n−1)-th row are electrically connected to the data signal lines DL_m, DL_(m+1) and DL_(m+2), and the pixels of the (n−1)-th row receive a scan signal /SS_(n−1) through the another scan signal line. The pixels of the n-th row are electrically connected to the data signal lines DL_m, DL_(m+1) and DL_(m+2), and the pixels of the n-th row receive the scan signal /SS_n through the scan signal line SL_n. The pixels of the (n+1)-th row are electrically connected to the data signal lines DL_m, DL_(m+1) and DL_(m+2), and the pixels of the (n+1)-th row receive a scan signal /SS_(n+1) through the yet another scan signal line. The switch transistors M1, M2 and M3 are electrically connected to the pixels of the (n−1)-th to (n+1)-th rows through the data signal lines DL_m, DL_(m+1) and DL_(m+2).

In the embodiment of the disclosure, a turn-on sequence of the switch transistors M1, M2 and M3 in a scan period of the pixels of the (n−1)-th row is different from a turn-on sequence of the plurality of the switch transistors M1, M2 and M3 in a scan period of the pixels of the n-th row, and the turn-on sequence of the switch transistors M1, M2 and M3 in a scan period of the pixels of the n-th row is also different from a turn-on sequence of the plurality of the switch transistors M1, M2 and M3 in a scan period of the pixels of the (n+1)-th row.

Specifically, during a scan period of the pixels of the (n−1)-th row from time ta0 to time ta1 in a k-th frame, the data driver circuit 1110 may output the common data signal Dout with different three data voltages (i.e. n−1[3], n−1[2], n−1[1]) for the corresponding three pixels of the (n−1)-th row. Moreover, the clock signals CKH_3, CKH_2, and CKH_1 may be sequentially changed from the low voltage level to the high voltage level to sequentially turn-on the switch transistors M3, M2 and M1 during the period from time ta0 to time ta1, and the de-multiplexer 1120 may sequentially provide the data voltages (i.e. n−1[3], n−1[2], n−1[1]) to the data signal lines DL_(m+2), DL_(m+1) and DL_m, and the data voltages (i.e. n−1[3], n−1[2], n−1[1]) may be stored into the corresponding data capacitors. Then, during a period at least partially overlapped with the period of the clock signal CKH_1 with a last clock waveform, the scan signal /SS_(n−1) is changed from the high voltage level to the low voltage level, and the data voltages (i.e. n−1[3], n−1[2], n−1[1]) stored in the corresponding data capacitors may be written to the gate voltages of the control terminals of the driving transistors of the three pixels of the (n−1)-th row. Thus, the three pixels of the (n−1)-th row may have the correct brightness according to the corresponding gate voltages when the three pixels of the (n−1)-th row are operated in the LED on state.

During a scan period of the pixels of the n-th row from time ta1 to time ta2 in the k-th frame, the data driver circuit 1110 may output the common data signal Dout with different three data voltages (i.e. n[1], n[2], n[3]) for the corresponding three pixels of the n-th row. Moreover, the clock signals CKH_1, CKH_2, and CKH_3 may be sequentially changed from the low voltage level to the high voltage level to sequentially turn-on the switch transistors M1, M2 and M3 during the period from time ta1 to time ta2, and the de-multiplexer 1120 may sequentially provide the data voltages (i.e. n[1], n[2], n[3]) to the data signal lines DL_m, DL_(m+1) and DL_(m+2), and the data voltages (i.e. n[1], n[2], n[3]) may be stored into the corresponding data capacitors. Then, during a period at least partially overlapped with the period of the clock signal CKH_3 with the last clock waveform, the scan signal /SS_n is changed from the high voltage level to the low voltage level, and the data voltages (i.e. n[1], n[2], n[3]) stored in the corresponding data capacitors may be written to the gate voltages of the control terminals of the driving transistors of the three pixels of the n-th row. Thus, the three pixels PL(m,n), PL(m+1,n) and PL(m+2,n) of the n-th row may have the correct brightness according to the corresponding gate voltages when the three pixels of the n-th row are operated in the LED on state.

During a scan period of the pixels of the (n+1)-th row from time ta2 to time ta3 in the k-th frame, the data driver circuit 1110 may output the common data signal Dout with different three data voltages (i.e. n+1[1], n+1[2], n+1[3]) for the corresponding three pixels of the (n+1)-th row. Moreover, the clock signals CKH_3, CKH_2, and CKH_1 may be sequentially changed from the low voltage level to the high voltage level to sequentially turn-on the switch transistors M3, M2 and M1 during the period from time ta2 to time ta3, and the de-multiplexer 1120 may sequentially provide the data voltages (i.e. n+1[1], n+1[2], n+1[3]) to the data signal lines DL_(m+2), DL_(m+1) and DL_m, and the data voltages (i.e. n+1[1], n+1[2], n+1[3]) may be stored into the corresponding data capacitors. Then, during a period at least partially overlapped with the period of the clock signal CKH_1 with the last clock waveform, the scan signal /SS_(n+1) is changed from the high voltage level to the low voltage level, and the data voltages (i.e. n+1[1], n+1[2], n+1[3]) stored in the corresponding data capacitors may be written to the gate voltages of the control terminals of the driving transistors of the three pixels of the (n+1)-th row. Thus, the three pixels of the (n+1)-th row may have the correct brightness in the k-th frame according to the corresponding gate voltages when the three pixels of the (n+1)-th row are operated in the LED on state.

Therefore, the turn-on sequences of the switch transistors M1, M2 and M3 in the scan periods of the (n−1)-th, n-th and (n+1)-th rows of the pixels are different row by row.

During a scan period of the pixels of the (n−1)-th row from time tb0 to time tb1 in a (k+1)-th frame, the data driver circuit 1110 may output the common data signal Dout with different three data voltages (i.e. n−1[1], n−1[2], n−1[3]) for the corresponding three pixels of the (n−1)-th row. Moreover, the clock signals CKH_1, CKH_2, and CKH_3 may be sequentially changed from the low voltage level to the high voltage level to sequentially turn-on the switch transistors M1, M2 and M3 during the period from time tb0 to time tb1, and the de-multiplexer 1120 may sequentially provide the data voltages (i.e. n−1[1], n−1[2], n−1[3]) to the data signal lines DL_m, DL_(m+1) and DL_(m+2), and the data voltages (i.e. n−1[1], n−1[2], n−1[3]) may be stored into the corresponding data capacitors. Then, during a period at least partially overlapped with the period of the clock signal CKH_3 with the last clock waveform, the scan signal /SS_(n−1) is changed from the high voltage level to the low voltage level, and the data voltages (i.e. n−1[1], n−1[2], n−1[3]) stored in the corresponding data capacitors may be written to the gate voltages of the control terminals of the driving transistors of the three pixels of the (n−1)-th row. Thus, the three pixels of the (n−1)-th row may have the correct brightness in the (k+1)-th frame according to the corresponding gate voltages when the three pixels of the (n−1)-th row are operated in the LED on state. During a scan period of the pixels of the n-th row from time tb1 to time tb2 in the (k+1)-th frame and a scan period of the pixels of the (n+1)-th row from time tb2 to time tb3 in the (k+1)-th frame, the waveform change relationships of the clock signals CKH_1, CKH_2, CKH_3, the scan signals /SS_n and /SS_(n+1) may be deduced by analogy.

Therefore, the turn-on sequences of the switch transistors M1, M2 and M3 in the scan periods of the (n−1)-th, n-th and (n+1)-th rows of the pixels are different frame by frame.

In the embodiment of the disclosure, a pre-charge sequence of the plurality of pre-charge periods the pre-charge transistors M4, M5 and M6 in a scan period of the pixels of the (n−1)-th row is different from a pre-charge sequence of the plurality of pre-charge periods the pre-charge transistors M4, M5 and M6 in a scan period of the pixels of the n-th row, and the pre-charge sequence of the plurality of pre-charge periods the pre-charge transistors M4, M5 and M6 in a scan period of the pixels of the n-th row is different from a pre-charge sequence of the plurality of pre-charge periods the pre-charge transistors M4, M5 and M6 in a scan period of the pixels of the (n+1)-th row. Moreover, one of the pre-charge transistors M4, M5 and M6 corresponding to the clock signal with the first clock waveform in a pre-charge period does not pre-charge its corresponding one of the data signal lines DL_m, DL_(m+1) and DL_(m+2) in the same pre-charge period. It should be noted that in FIG. 15, the pre-charge voltage VPC is not provided to the data line corresponding to the first clock signal in each scan period. For the solution of "Reverse operation impossible" issue, th data line reset function is only necessary at before the last clock signal, but in order to distribute the brightness difference, the pre-charge voltage VPC may be provided with the second and third clock signals. By this feature, the first clock signal may start earlier, and its pulse width can be extended.

Specifically, during the scan period of the pixels of the (n−1)-th row from time ta0 to time ta1 in a k-th frame, the pre-charge control signals PC_2 and PC_1 may be sequentially changed from the low voltage level to the high voltage level to sequentially turn-on the pre-charge transistors M5 and M4 during the period from time ta0 to time ta1, and the pre-charge circuit 1130 may sequentially reset the voltages of the data signal lines DL_(m+1) and DL_m. Moreover, the pre-charge transistor M4 does not pre-charge the data signal line DL_(m+2) receiving the clock signal CKH3 with the first clock waveform during the scan period.

During the scan period of the pixels of the n-th row from time ta1 to time ta2 in a k-th frame, the pre-charge control signals PC_2 and PC_3 may be sequentially changed from the low voltage level to the high voltage level to sequentially turn-on the pre-charge transistors M5 and M6 during the period from time ta1 to time ta2, and the pre-charge circuit 1130 may sequentially reset the voltages of the data signal lines DL_(m+1) and DL_(m+2). Moreover, the pre-charge transistor M4 does not pre-charge the data signal line DL_m receiving the clock signal CKH1 with the first clock waveform during the scan period.

During the scan period of the pixels of the (n+1)-th row from time ta2 to time ta3 in a k-th frame, the pre-charge control signals PC_2 and PC_1 may be sequentially changed from the low voltage level to the high voltage level to sequentially turn-on the pre-charge transistors M5 and M4 during the period from time ta2 to time ta3, and the pre-charge circuit 1130 may sequentially reset the voltages of the data signal lines DL_(m+1) and DL_m. Moreover, the pre-charge transistor M6 does not pre-charge the data signal line DL_(m+2) receiving the clock signal CKH3 with the first clock waveform during the scan period.

Therefore, the pre-charge sequences of the pre-charge transistors M4, M5 and M6 in the scan periods of the (n−1)-th, n-th and (n+1)-th rows of the pixels are different row by row.

During the scan period of the pixels of the n-th row from time tb0 to time tb1 in a (k+1)-th frame, the pre-charge control signals PC_2 and PC_3 may be sequentially changed from the low voltage level to the high voltage level to sequentially turn-on the pre-charge transistors M5 and M6 during the period from time tb0 to time tb1, and the pre-charge circuit 1130 may sequentially reset the voltages of the data signal lines DL_(m+1) and DL_(m+2). Moreover, the pre-charge transistor M6 does not pre-charge the data signal line DL_m receiving the clock signal CKH1 with the first clock waveform during the scan period.

During the scan period of the pixels of the n-th row from time tb1 to time tb2 in the (k+1)-th frame and the scan period of the pixels of the (n+1)-th row from time tb2 to time tb3 in the (k+1)-th frame, the waveform change relationships of the pre-charge control signals PC_1, PC_2, and PC_3 may be deduced by analogy.

Therefore, the pre-charge sequences of the pre-charge transistors M4, M5 and M6 in the scan periods of the (n−1)-th, n-th and (n+1)-th rows of the pixels are different frame by frame.

Figure 16:
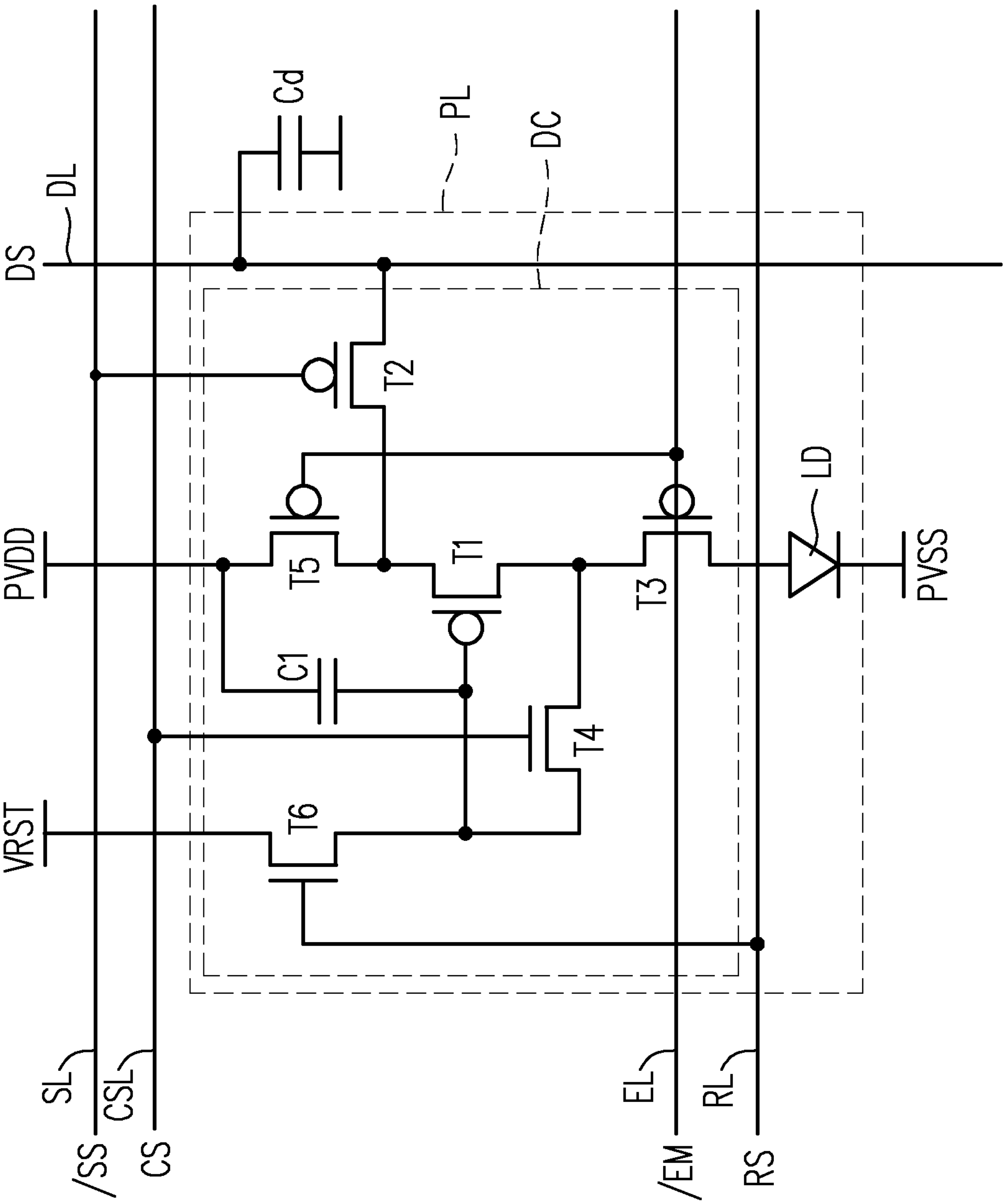
FIG. 16 is a schematic diagram of a display device according to an embodiment of the disclosure.

FIG. 16 is a schematic diagram of a display device according to an embodiment of the disclosure. Referring to FIG. 16, each pixel of each embodiment of the disclosure may be implemented in the same way as the pixel PL of FIG. 16. In the embodiment of the disclosure, the pixel PL includes a light-emitting diode LD and a driving circuit DC. The driving circuit DC includes a driving transistor T1, a scan transistor T2, two emission transistors T3 and T5, a compensation transistor T4, a reset transistor T6 and a storage capacitor C1. In the embodiment of the disclosure, a first terminal of the driving transistor T1 is electrically connected to a first terminal of the scan transistor T2 and a second terminal of the emission transistor T5. A control terminal of the driving transistor T1 is electrically connected to a first terminal of the compensation transistor T4, a second terminal of the reset transistor T6 and a second terminal of the storage capacitor C1. A second terminal of the driving transistor T1 is electrically connected to a first terminal of the emission transistor T3 and a second terminal of the compensation transistor T4. A control terminal of the scan transistor T2 is electrically connected to a scan signal line SL to receive a scan signal /SS. A second terminal of the scan transistor T2 is electrically connected to the data signal line DL to receive the data signal DS. A first terminal of the emission transistor T3 is electrically connected to the second terminal of the driving transistor T1 and the second terminal of the compensation transistor T4. A control terminal of the emission transistor T3 is electrically connected to the emission signal line EL to receive the emission signal /EM. A second terminal of the emission transistor T3 is electrically connected to the light-emitting diode LD, therefore, the driving transistor T1 is electrically connected to the light-emitting diode LD through the emission transistor T3. The first terminal of the compensation transistor T4 is electrically connected to the second terminal of the reset transistor T6, the second terminal of the storage capacitor C1 and the control terminal of the driving transistor T1, in other words, the compensation transistor T4 is electrically connected between the control terminal and the second terminal of the driving transistor T1. A control terminal of the compensation transistor T4 is electrically connected to a compensation signal line CSL to receive a compensation signal CS. The second terminal of the compensation transistor T4 is electrically connected to the second terminal of the driving transistor T1 and the first terminal of the emission transistor T3. A first terminal of the emission transistor T5 is electrically connected to a first terminal of the storage capacitor C1 and a first operation voltage PVDD. A control terminal of the emission transistor T5 is electrically connected to the emission signal line EL to receive the emission signal /EM. A second terminal of the emission transistor T5 is electrically connected to the first terminal of the driving transistor T1 and the first terminal of the scan transistor T2. A first terminal of the reset transistor T6 is electrically connected to a reset voltage VRST. A control terminal of the reset transistor T6 is electrically connected to a reset signal line RL to receive the reset signal RS. A second terminal of the reset transistor T6 is electrically connected to the second terminal of the storage capacitor C1, the control terminal of the driving transistor T1 and the first terminal of the compensation transistor T4. The light-emitting diode LD is electrically connected between the second terminal of the emission transistor T3 and a second operation voltage PVSS.

In the embodiment of the disclosure, the display device 100 of FIG. 1 may be manufactured using a low temperature polycrystalline oxide (LTPO) process. The driving transistor T1, the scan transistor T2, the emission transistors T3 and T5 may be P-type transistors. The compensation transistor T4 and the reset transistor T6 may be N-type transistors. In the embodiment of the disclosure, the light-emitting diode LD may be an active matrix light-emitting diode (AM-LED), but the disclosure is also not limited thereto.

Figure 17:
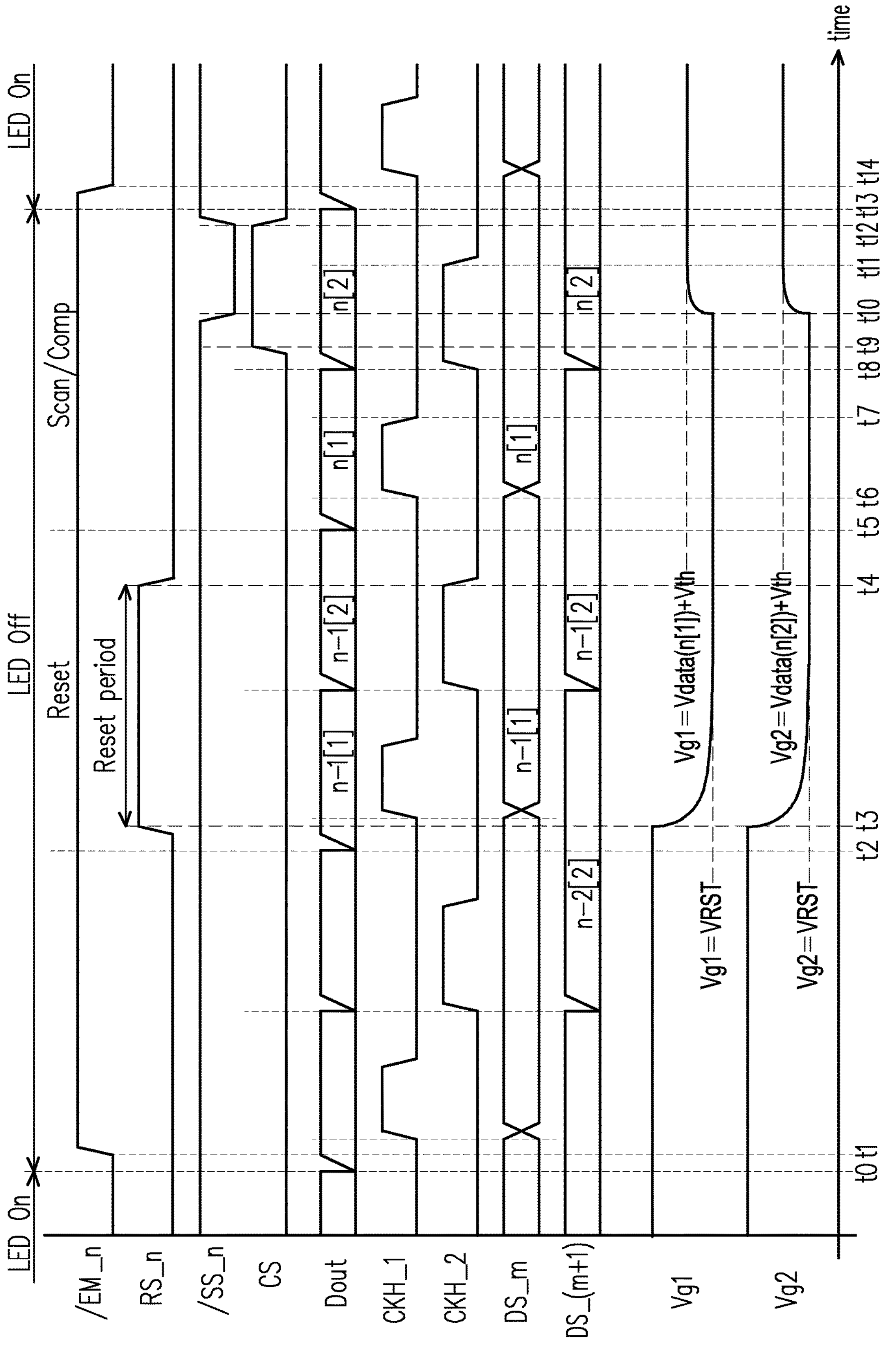
FIG. 17 is a schematic diagram of waveforms of a plurality of related signals according to an embodiment of the disclosure.

FIG. 17 is a schematic diagram of waveforms of a plurality of related signals according to an embodiment of the disclosure. Referring to FIG. 1 and FIG. 17, the display device 100 of FIG. 1 may be operated according to the signals of FIG. 17, and the specific circuit architectures of the pixels PL(m,n) and PL(m+1,n) may be implemented in the same way as the pixel PL of FIG. 16. During a period from time t0 to time t13, the pixels PL(m,n) and PL(m+1,n) may be operated in LED off state. During a period from time t1 to time t14, the emission signal /EM_n is changed to a high voltage level, and the light emitting diodes of the pixels PL(m,n) and PL(m+1,n) may be turned-off (because the emission transistors T3 and T5 in FIG. 16 is turned-off). During a period from time t2 to time t5, the pixels PL(m,n) and PL(m+1,n) may be operated in a reset mode. During a reset period from time t3 to time t4, the reset signal RS is changed from a low voltage level to the high voltage level, and the gate voltages Vg1 and Vg2 of the control terminals of the driving transistors (i.e. the driving transistor T1 in FIG. 16) of the pixels PL(m,n) and PL(m+1,n) may be reset to the reset voltage VRST (because the reset transistor T6 in FIG. 16 is turned-on). During a period from time t5 to time t13, the pixels PL(m,n) and PL(m+1,n) may be operated in a scan/compensation mode. During a period from time t5 to time t8, the data driver circuit 110 may provide a common data signal Dout with a data voltage (n[1]) for the pixel PL(m,n) of n-th row of the pixel array the display device 100. During a period from time t8 to time t13, the data driver circuit 110 may provide a common data signal Dout with a data voltage (n[2]) for the pixel PL(m+1,n) of n-th row of the pixel array the display device 100.

During a period from time t6 to time t7, the clock signal CKH_1 is changed from the low voltage level to the high voltage level, and the switch transistor M1 is turned-on. Thus, the data signal line DL_m may transmit the data signal DS_m with the data voltage (n[1]) to the pixel PL(m,n), and store the data voltage (n[1]) into the data capacitor Cd_m. During a period from time t8 to time t11, the clock signal CKH_2 is changed from the low voltage level to the high voltage level, and the switch transistor M2 is turned-on. Thus, the data signal line DL_(m+1) may transmit the data signal DS_(m+1) with the data voltage (n[2]) to the pixel PL(m+1,n), and store the data voltage (n[2]) into the data capacitor Cd_(m+1).

During a period from time t9 to time t12, the compensation signal CS is changed from the low voltage level to the high voltage level, and the compensation transistor T4 is turned-on, and the driving transistor T1 forms a diode connection. During a period from time t10 to time t12, the scan signal /SS is changed from the high voltage level to the low voltage level, and the scan transistor T2 is turned-on, the data voltage (n[1]) in the data capacitor Cd_m and the data voltage (n[2]) in the data capacitor Cd_(m+1) may transmit into the pixel PL(m,n) and PL(m+1,n) respectively. By the diode clamp effect, the gate voltage Vg1 of the control terminal of the driving transistor (i.e. the driving transistor T1 in FIG. 16) of the pixel PL(m,n) may be changed to the voltage of a data voltage (n[1]) plus a threshold voltage Vth of driving transistor, and the gate voltage Vg2 of the control terminal of the driving transistor (i.e. the driving transistor T1 in FIG. 16) of the pixel PL(m+1,n) may be changed to the voltage of a data voltage (n[2]) plus a threshold voltage Vth of driving transistor. That is, the period (i.e. time t10 to time t12) of the scan waveform (i.e. the waveform of the low voltage level) of the scan signal /SS is overlapped with the period (i.e. time t8 to time t11) of clock signal CKH_2 with a last clock waveform. Therefore, the light emitting diodes of the pixels PL(m,n) and PL(m+1,n) may have the correct brightness according to the gate voltages Vg1 and Vg2 when the pixels PL(m,n) and PL(m+1,n) are operated in the LED on state (i.e. after time t14).

In summary, the display device of the disclosure can effectively reduce the number of the data driver circuits by arranged at least one of the de-multiplexer in the display device. Moreover, each pixel of the display device can have correct brightness, thereby realizing good display effect.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:

a plurality of pixels, electrically connected to a plurality of data signal lines and a scan signal line, and configured to receive a scan signal through the scan signal line; and a de-multiplexer, comprising a plurality of switch transistors electrically connected to the plurality of pixels through the plurality of data signal lines, wherein the plurality of switch transistors are controlled by a plurality of clock signals, wherein a period of a scan waveform of the scan signal is at least partially overlapped with a period of one of the plurality of clock signals with a last clock waveform, wherein the period of the scan waveform of the scan signal is started after a start of the last clock waveform.

2. The display device according to claim 1, wherein each one of the plurality of pixels comprises:

a light-emitting diode; and a driving circuit, electrically connected to the light-emitting diode, and comprises:

a driving transistor, electrically connected to the light-emitting diode;

a first storage capacitor, electrically connected to the driving transistor and comprising a control terminal, a first terminal and a second terminal;

a scan transistor, wherein a control terminal of the scan transistor is configured to receive the scan signal; and a compensation transistor, electrically connected between a control terminal and one of the first terminal and the second terminal of the driving transistor.

3. The display device according to claim 2, wherein a first terminal of the scan transistor is electrically connected to the first terminal of the driving transistor, and a second terminal of the scan transistor is electrically connected to the corresponding data signal line.

4. The display device according to claim 2, wherein the driving circuit further comprise a second storage capacitor, a first terminal of the scan transistor is electrically connected to the second storage capacitor, and a second terminal of the scan transistor is electrically connected to the corresponding data signal line.

5. The display device according to claim 2, wherein a control terminal of the compensation transistor is configured to receive the scan signal.

6. The display device according to claim 2, wherein a control terminal of the compensation transistor is configured to receive a compensation signal.

7. The display device according to claim 1, comprising:

a pixel array, comprising the plurality of pixels and another plurality of pixels, wherein the plurality of pixels and another plurality of pixels are arranged in different rows, wherein the another plurality of pixels are electrically connected to the plurality of data signal lines and another scan signal line, and the another plurality of pixels are configured to receive another scan signal through the another scan signal line, wherein the plurality of switch transistors are electrically connected to the another plurality of pixels through the plurality of data signal lines, wherein a turn-on sequence of the plurality of switch transistors in a scan period of the plurality of pixels is different from another turn-on sequence of the plurality of switch transistors in another scan period of the another plurality of pixels.

8. The display device according to claim 7, wherein a plurality of turn-on sequences of the plurality of switch transistors in a plurality of scan periods of the pixel array are different row by row.

9. The display device according to claim 7, wherein a plurality of turn-on sequences of the plurality of switch transistors in a plurality of scan periods of the pixel array are different frame by frame.

10. A display device, comprising:

a plurality of pixels, electrically connected to a plurality of data signal lines and a scan signal line, and configured to receive a scan signal through the scan signal line;

a de-multiplexer, comprising a plurality of switch transistors electrically connected to the plurality of pixels through the plurality of data signal lines, wherein the plurality of switch transistors are controlled by a plurality of clock signals; and a pre-charge circuit, electrically connected to at least one of the plurality of data signal lines, and configured to pre-charge the at least one of the plurality of data signal lines, wherein a period of a scan waveform of the scan signal is at least partially overlapped with a period of one of the plurality of clock signals with a last clock waveform, wherein the period of the scan waveform of the scan signal is started after a start of the last clock waveform.

11. The display device according to claim 10, wherein the pre-charge circuit pre-charges the at least one of the plurality of data signal lines according to a pre-charge control signal and a pre-charge voltage.

12. The display device according to claim 11, wherein the pre-charge circuit comprises a pre-charge transistor, and a control terminal of the pre-charge transistor is configured to receive the pre-charge control signal, a first terminal of the pre-charge transistor is configured to receive the pre-charge voltage, and a second terminal of the pre-charge transistor is electrically connected to the at least one of the plurality of data signal lines.

13. The display device according to claim 10, wherein the pre-charge circuit pre-charges one of the plurality of data signal lines electrically connected to the switch transistor receiving the clock signal with the last clock waveform during a pre-charge period.

14. The display device according to claim 13, wherein the pre-charge period is overlapped with a period of a non-last clock waveform of another one of the plurality of clock signals.

15. The display device according to claim 10, wherein the pre-charge circuit comprises a plurality of pre-charge transistors, the plurality of pre-charge transistors are electrically connected to the plurality of data signal lines, and configured to pre-charge the plurality of data signal lines according to a pre-charge control signal, wherein a pre-charge period of the pre-charge control signal is earlier than periods of a plurality of clock waveforms of the plurality of clock signals.

16. The display device according to claim 10, wherein the pre-charge circuit comprises a plurality of pre-charge transistors, the plurality of pre-charge transistors are electrically connected to the plurality of data signal lines, and configured to pre-charge the plurality of data signal lines according to different pre-charge control signals during a plurality of pre-charge periods, wherein the second to last pre-charge periods are overlapped with at least one period of a plurality of non-last clock waveforms of part of the plurality of clock signals.

17. The display device according to claim 10, further comprising:

a pixel array, comprising the plurality of pixels and another plurality of pixels, wherein the plurality of pixels and another plurality of pixels are arranged in different rows, and the another plurality of pixels are electrically connected to the plurality of data signal lines and another scan signal line, wherein the plurality of switch transistors are electrically connected to the another plurality of pixels through the plurality of data signal lines, wherein a turn-on sequence of the plurality of switch transistors in a scan period of the plurality of pixels is different from another turn-on sequence of the plurality of switch transistors in another scan period of the another plurality of pixels, wherein the at least one pre-charge circuit comprises a plurality of pre-charge transistors, the plurality of pre-charge transistors are electrically connected to the plurality of data signal lines, and configured to pre-charge at least part of the plurality of data signal lines during a plurality of pre-charge periods of the plurality of pixels and another plurality of pre-charge periods of the another plurality of pixels, wherein a pre-charge sequence of the plurality of pre-charge periods is different from another pre-charge sequence of the another plurality of pre-charge periods.

18. The display device according to claim 17, wherein a plurality of pre-charge sequences of a plurality of rows of the pixel array are different row by row.

19. The display device according to claim 17, wherein a plurality of pre-charge sequences of a plurality of rows of the pixel array are different frame by frame.

20. The display device according to claim 17, wherein one of the plurality of pre-charge transistors corresponding to the clock signal with the first clock waveform in one of the plurality of pre-charge periods does not pre-charge its corresponding one of the plurality of data signal lines in the same one of the plurality of pre-charge period.

* * * * *